United States Patent
Ikriannikov

(10) Patent No.: US 9,287,038 B2
(45) Date of Patent: Mar. 15, 2016

(54) COUPLED INDUCTORS WITH NON-UNIFORM WINDING TERMINAL DISTRIBUTIONS

(71) Applicant: Volterra Semiconductor Corporation, Fremont, CA (US)

(72) Inventor: Alexandr Ikriannikov, Castro Valley, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 263 days.

(21) Appl. No.: 13/802,363

(22) Filed: Mar. 13, 2013

(65) Prior Publication Data

US 2014/0266086 A1    Sep. 18, 2014

(51) Int. Cl.
| | |
|---|---|
| H01F 5/00 | (2006.01) |
| H01F 27/02 | (2006.01) |
| H01F 27/28 | (2006.01) |
| H01F 17/06 | (2006.01) |
| H01F 27/24 | (2006.01) |
| H01F 17/04 | (2006.01) |
| H01F 30/12 | (2006.01) |
| H02M 3/158 | (2006.01) |

(52) U.S. Cl.
CPC ............... *H01F 30/12* (2013.01); *H01F 17/04* (2013.01); *H02M 3/1584* (2013.01)

(58) Field of Classification Search
CPC .................................. H01F 5/00; H01F 27/28
USPC .......... 336/83, 170, 178, 200, 212, 214, 215, 336/220, 221, 222, 232
See application file for complete search history.

(56) References Cited

U.S. PATENT DOCUMENTS

| | | | |
|---|---|---|---|
| 2,170,446 | A | 8/1939 | Edwards |
| 2,212,543 | A | 8/1940 | Jovy |
| 2,298,935 | A | 10/1942 | Freeman |
| 2,403,393 | A | 7/1946 | Peterson |
| 3,447,068 | A | 5/1969 | Hart |
| 3,671,847 | A | 6/1972 | Shibano |
| 3,878,495 | A | 4/1975 | Thomas |
| 4,488,136 | A | 12/1984 | Hansen et al. |
| 5,003,277 | A | 3/1991 | Sokai et al. |
| 5,177,460 | A | 1/1993 | Dhyanchand et al. |
| 5,182,535 | A | 1/1993 | Dhyanchand |
| 5,436,818 | A | 7/1995 | Barthold |
| 5,525,951 | A | 6/1996 | Sunano et al. |
| 5,737,203 | A | 4/1998 | Barrett |
| 5,847,518 | A | 12/1998 | Ishiwaki |
| 6,018,468 | A | 1/2000 | Archer et al. |
| 6,060,977 | A | 5/2000 | Yamamoto et al. |
| 6,147,584 | A | 11/2000 | Shin'el |
| 6,304,460 | B1 | 10/2001 | Cuk |
| 6,348,848 | B1 | 2/2002 | Herbert |

(Continued)

FOREIGN PATENT DOCUMENTS

WO    WO 2006/026674    3/2006

*Primary Examiner* — Tsz Chan
(74) *Attorney, Agent, or Firm* — Lathrop & Gage LLP

(57) ABSTRACT

A coupled inductor includes a ladder magnetic core including two opposing rails extending in a lengthwise direction and joined by a plurality of rungs. The coupled inductor further includes a respective winding wound around each of the plurality of rungs. The plurality of rungs are divided into at least two groups of rungs, and a lengthwise separation distance between adjacent rungs in each group of rungs is less than a lengthwise separation distance between adjacent rungs of different groups of rungs.

12 Claims, 26 Drawing Sheets

(56) References Cited

U.S. PATENT DOCUMENTS

| | | |
|---|---|---|
| 6,362,986 B1 | 3/2002 | Schultz et al. |
| 6,377,155 B1 | 4/2002 | Allen et al. |
| 6,388,896 B1 | 5/2002 | Cuk |
| 6,714,428 B2 | 3/2004 | Huang et al. |
| 6,737,951 B1 | 5/2004 | Decristofaro et al. |
| 6,784,644 B2 | 8/2004 | Xu et al. |
| 6,856,230 B2 | 2/2005 | Lu |
| 6,980,077 B1 | 12/2005 | Chandrasekaran et al. |
| 7,352,269 B2 | 4/2008 | Li et al. |
| 7,498,920 B2 | 3/2009 | Sullivan et al. |
| 7,567,163 B2 | 7/2009 | Dadafshar et al. |
| 7,880,577 B1 | 2/2011 | Glaser et al. |
| 7,994,888 B2 | 8/2011 | Ikriannikov |
| 2004/0130426 A1 | 7/2004 | Suzuki |
| 2005/0024179 A1 | 2/2005 | Chandrasekaran et al. |
| 2006/0197510 A1 | 9/2006 | Chandrasekaran |
| 2007/0175701 A1 | 8/2007 | Xu et al. |
| 2007/0176726 A1 | 8/2007 | Xu et al. |
| 2009/0179723 A1 | 7/2009 | Ikriannikov et al. |
| 2009/0231081 A1 | 9/2009 | Ikriannikov et al. |
| 2009/0237197 A1* | 9/2009 | Ikriannikov et al. .......... 336/212 |
| 2010/0007457 A1 | 1/2010 | Yan et al. |
| 2010/0171580 A1* | 7/2010 | Abe et al. ...................... 336/178 |
| 2011/0018669 A1 | 1/2011 | Ikriannikov |
| 2011/0032068 A1 | 2/2011 | Ikriannikov |
| 2011/0035607 A1* | 2/2011 | Ikriannikov .................. 713/300 |
| 2011/0043317 A1 | 2/2011 | Ikriannikov |
| 2011/0050191 A1 | 3/2011 | Tsuji et al. |
| 2011/0148559 A1* | 6/2011 | Ikriannikov .................. 336/192 |
| 2011/0148560 A1 | 6/2011 | Ikriannikov |
| 2011/0169476 A1 | 7/2011 | Ikriannikov |
| 2011/0260822 A1 | 10/2011 | Ikriannikov |
| 2011/0279100 A1 | 11/2011 | Ikriannikov |
| 2011/0279212 A1* | 11/2011 | Ikriannikov et al. .......... 336/192 |
| 2011/0286143 A1 | 11/2011 | Ikriannikov |
| 2011/0286144 A1 | 11/2011 | Ikriannikov |
| 2012/0056703 A1* | 3/2012 | Ikriannikov .................. 336/105 |
| 2012/0056704 A1 | 3/2012 | Nagano et al. |

* cited by examiner

COUPLED INDUCTORS WITH NON-UNIFORM WINDING TERMINAL DISTRIBUTIONS

BACKGROUND

It is known to electrically couple multiple switching sub-converters in parallel to increase switching power converter capacity and/or to improve switching power converter performance. One type of switching power converter with multiple switching sub-converters is a "multi-phase" switching power converter, where the sub-converters, which are often referred to as "phases," switch out-of-phase with respect to each other. Such out-of-phase switching results in ripple current cancellation at the converter output filter and allows the multi-phase converter to have a better transient response than an otherwise similar single-phase converter.

As taught in U.S. Pat. No. 6,362,986 to Schultz et al., which is incorporated herein by reference, a multi-phase switching power converter's performance can be improved by magnetically coupling the energy storage inductors of two or more phases. Such magnetic coupling results in ripple current cancellation in the inductors and increases ripple switching frequency, thereby improving converter transient response, reducing input and output filtering requirements, and/or improving converter efficiency, relative to an otherwise identical converter without magnetically coupled inductors.

Two or more magnetically coupled inductors are often collectively referred to as a "coupled inductor" and have associated leakage inductance and magnetizing inductance values. Magnetizing inductance is associated with magnetic coupling between windings; thus, the larger the magnetizing inductance, the stronger the magnetic coupling between windings. Leakage inductance, on the other hand, is associated with energy storage. Thus, the larger the leakage inductance, the more energy stored in the inductor. Leakage inductance results from leakage magnetic flux, which is magnetic flux generated by current flowing through one winding of the inductor that is not coupled to the other windings of the inductor.

Integrated circuits including two or more power stages have been developed for use in switching power converters. For example, FIG. 1 shows a top plan view of a prior art four-phase buck switching power converter 100 including two integrated circuits 102 and a coupled inductor 104. In this document, specific instances of an item may be referred to by use of a numeral in parentheses (e.g., integrated circuit 102 (1)) while numerals without parentheses refer to any such item (e.g., integrated circuits 102). Coupled inductor 104 includes four windings 106, and opposing ends of each winding form respective first and second solder tabs 108, 110. Solder tabs 108, 110 are uniformly distributed along a length 112 of coupled inductor 104.

Each integrated circuit 102 includes two buck power stages (not shown) and two terminal sets 114. Each terminal set 114 include one or more electrical terminals, such as one or more solder balls, electrically coupled to a common node and disposed on a bottom outer surface of integrated circuit 102. Terminal sets 114 are symbolically indicated by dashed line in the FIG. 1 top plan view because the terminal sets are not visible when looking at the tops of integrated circuits 102. Each terminal set 114 provides electrical interface to a respective power stage of the integrated circuit. Both power stages and associated terminal sets 114 are located in the same portion of the integrated circuit, to ease integrated circuit design and construction. Thus, terminal sets 114 are located close together on integrated circuit 102.

Each terminal set 114 is electrically coupled to a respective first solder tab 108 by a conductor (not shown), such as a printed circuit board (PCB) conductive "trace." Each power stage and its respective winding 106 form part of a phase of buck switching converter 100. Accordingly, each integrated circuit 102 supports a respective pair of converter 100 phases, and coupled inductor 104 supports all four phases of converter 100.

SUMMARY

In an embodiment, a coupled inductor includes a ladder magnetic core having a length, a width, and a height. The ladder magnetic core includes two rails extending in the lengthwise direction and joined in the widthwise direction by at least first, second, third, and fourth rungs sequentially disposed along the length of the magnetic core. The coupled inductor further includes first, second, third, and fourth windings wound at least partially around the first, second, third, and fourth rungs, respectively. The second rung is substantially closer in the lengthwise direction to the first rung than to the third rung, and the third rung is substantially closer in the lengthwise direction to the fourth rung than to the second rung.

In an embodiment, a coupled inductor includes a ladder magnetic core, a first winding, and a second winding. The ladder magnetic core has a length, a width, and a height. The ladder magnetic core includes first and second rails extending in the lengthwise direction and joined in the widthwise direction by at least first and second rungs. The first winding is wound, in a first orientation, at least partially around the first rung, and the second winding is wound, in a second orientation, at least partially around the second rung. The second orientation is opposite to the first orientation. Opposing ends of the first winding form first and second solder tabs, respectively, and opposing ends of the second winding form third and fourth solder tabs, respectively. The first and third solder tabs are disposed at least partially on a bottom outer surface of the first rail, and the second and fourth solder tabs are disposed at least partially on a bottom outer surface of the second rail. The first and second windings are arranged such that current flowing into the first and third solder tabs flows in a common direction around each of the first and second rungs, respectively, when seen looking cross-sectionally in the widthwise direction of the magnetic core.

In an embodiment, a coupled inductor includes a ladder magnetic core, a first winding, a second winding, and a third winding. The ladder magnetic core has a length, a width, and a height. The ladder magnetic core includes two rails joined in the heightwise direction by at least first, second, and third rungs respectively disposed along the length of the magnetic core. The first winding is wound, in a first orientation, at least partially around the first rung. The second winding is wound, in a second orientation opposite to the first orientation, at least partially around the second rung. The third winding is wound, in the first orientation, at least partially around the third rung. The second rung is substantially closer in the lengthwise direction to the first rung than to the third rung.

In an embodiment, a coupled inductor includes a ladder magnetic core including two opposing rails extending in a lengthwise direction and joined by a plurality of rungs. The coupled inductor further includes a respective winding wound around each of the plurality of rungs. The plurality of rungs are divided into at least two groups of rungs, and a lengthwise separation distance between adjacent rungs in each group of rungs is less than a lengthwise separation distance between adjacent rungs of different groups of the at least two groups.

In an embodiment, a multi-phase switching power converter includes a coupled inductor including a ladder magnetic core having a length, a width, and a height. The ladder magnetic core includes two rails extending in the lengthwise direction and joined in the widthwise direction by at least first, second, third, and fourth rungs sequentially disposed along the length of the magnetic core. The coupled inductor further includes first, second, third, and fourth windings wound at least partially around the first, second, third, and fourth rungs, respectively. The second rung is substantially closer in the lengthwise direction to the first rung than to the third rung, and the third rung is substantially closer in the lengthwise direction to the fourth rung than to the second rung. The multi-phase switching power converter further includes first, second, third, and fourth switching circuits. Each switching circuit is adapted to repeatedly switch an end of a respective one of the first, second, third, and fourth windings between at least two different voltage levels.

In an embodiment, a multi-phase switching power converter includes a coupled inductor including a ladder magnetic core, a first winding, and a second winding. The ladder magnetic core has a length, a width, and a height. The ladder magnetic core includes first and second rails extending in the lengthwise direction and joined in the widthwise direction by at least first and second rungs. The first winding is wound, in a first orientation, at least partially around the first rung, and the second winding is wound, in a second orientation, at least partially around the second rung. The second orientation is opposite to the first orientation. Opposing ends of the first winding form first and second solder tabs, respectively, and opposing ends of the second winding form third and fourth solder tabs, respectively. The first and third solder tabs are disposed at least partially on a bottom outer surface of the first rail, and the second and fourth solder tabs are disposed at least partially on a bottom outer surface of the second rail. The first and second windings are arranged such that current flowing into the first and third solder tabs flows in a common direction around each of the first and second rungs, respectively, when seen looking cross-sectionally in the widthwise direction of the magnetic core. The multi-phase switching power converter further includes first and second switching circuits. The first switching circuit is adapted to repeatedly switch the first solder tab between at least two different voltage levels, and the second switching circuit is adapted to repeatedly switch the third solder tab between at least two different voltage levels.

In an embodiment, a multi-phase switching power converter includes a coupled inductor, including a ladder magnetic core and first, second, and third windings. The ladder magnetic core has a length, a width, and a height. The ladder magnetic core includes two rails joined in the heightwise direction by at least first, second, and third rungs respectively disposed along the length of the magnetic core. The first winding is wound, in a first orientation, at least partially around the first rung. The second winding is wound, in a second orientation opposite to the first orientation, at least partially around the second rung. The third winding is wound, in the first orientation, at least partially around the third rung. The second rung is substantially closer in the lengthwise direction to the first rung than to the third rung. The multi-phase switching power converter further includes first, second, and third switching circuits. Each switching circuit is adapted to repeatedly switch an end of a respective one of the first, second, and third windings between at least two different voltage levels.

DETAILED DESCRIPTION OF THE EMBODIMENTS

Figure 1:
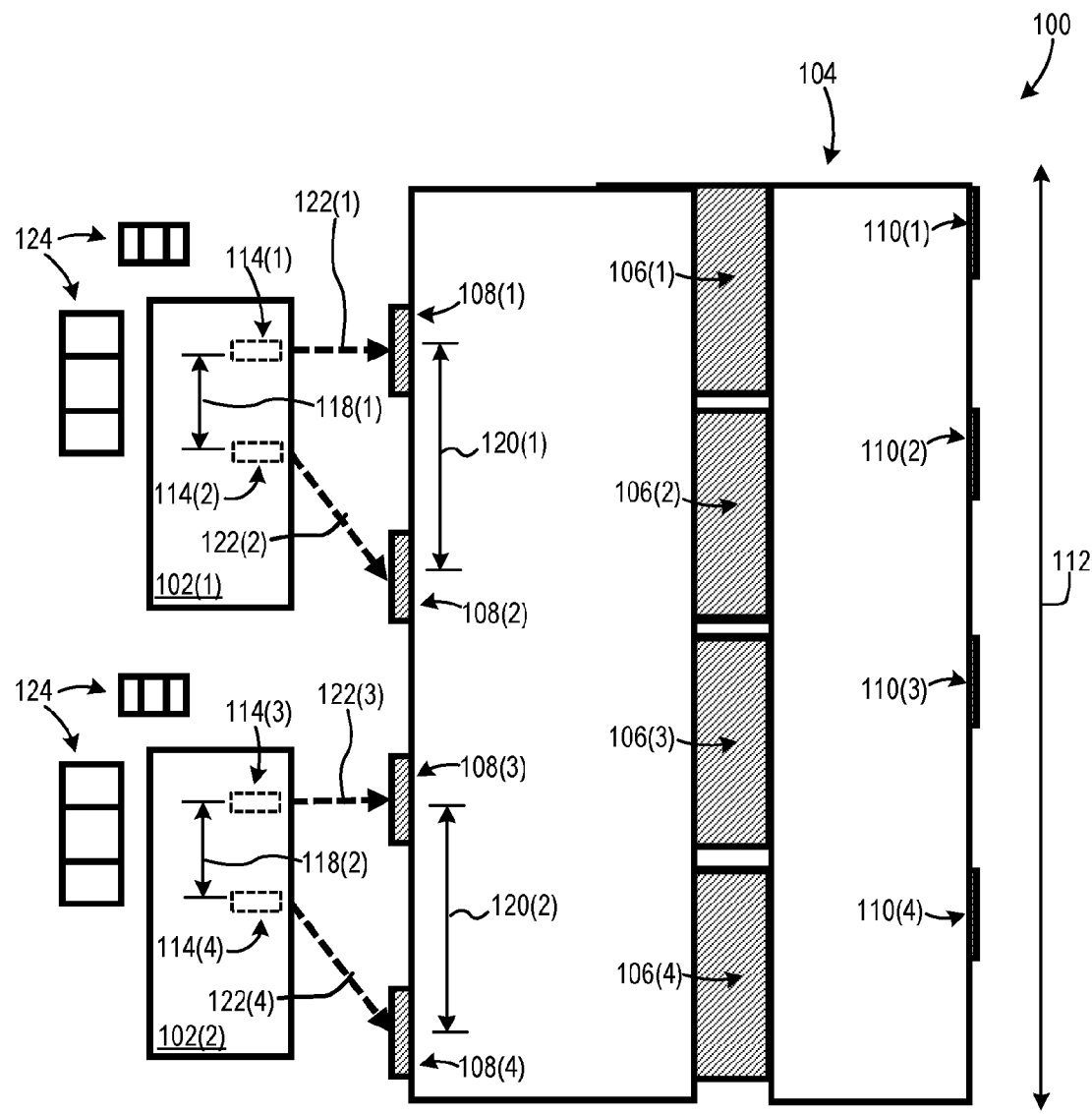
FIG. 1 shows a top plan view of a prior art four-phase buck switching power converter including two integrated circuits and a coupled inductor.

While there are significant benefits to pairing coupled inductors with integrated power stages, Applicant has discovered that there are also drawbacks. For example, consider again multi-phase switching power converter 100 of FIG. 1. A pitch 118 between integrated circuit terminal sets 114 is significantly smaller than a pitch 120 between solder tabs 108. This pitch discrepancy makes it is impossible to align every terminal set 114 with a respective solder tab 108. Misalignment of terminal sets 114 and solder tabs 108 results in long length and associated high impedance of some conductors between terminal sets 114 and solder tabs 108. Additionally, converter 100 typically includes additional components 124, such as resistors and capacitors, which support integrated circuits 102. Additional components 124 may further impede alignment of terminal sets 114 and solder tabs 108 by constraining placement of integrated circuits 102 and associated conductor routing.

Each terminal set 114 is separated from its respective solder tab by a separation distance 122. Separation distances 122(1), 122(3) are relatively short because terminal sets 114(1), 114(3) are aligned with solder tabs 108(1), 108(3). In contrast, separation distances 122(2), 122(4) are relatively long because terminal sets 114(2), 114(4) are not aligned with solder tabs 108(2), 108(4). Conductors spanning separation distances 122(2), 122(4) will therefore be long and have relatively high impedances.

High conductor impedance is undesirable, for example, because it causes significant conduction losses at high current levels, thereby impairing converter efficiency and causing undesired converter heating. Additionally, long conductors may cause electromagnetic interference with nearby circuitry, when high slew rate current flows through the conductors. Conductor impedance may be particularly significant when the conductors are PCB traces, because PCB traces are normally formed of thin metallic foil having relatively high impedance, as compared to relatively thick metallic solder tabs 108 and associated windings 106.

Accordingly, Applicant has developed coupled inductors with non-uniform winding terminal distributions, which facilitate aligning the winding terminals with integrated circuit terminals. As discussed below, use of these coupled inductors, instead of conventional coupled inductors, may at least partially overcome one or more of the problems discussed above.

Figure 2:
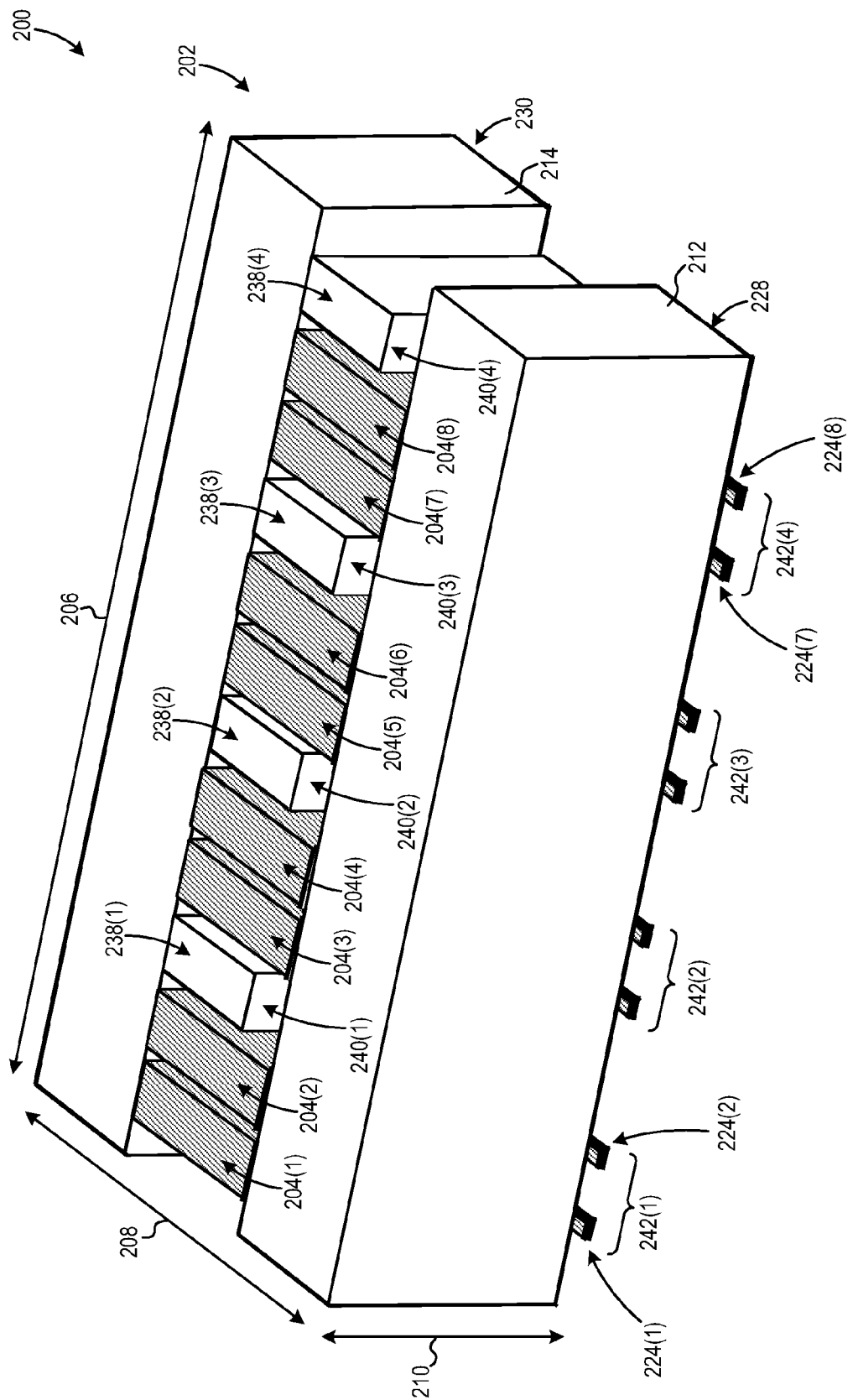
FIG. 2 shows a perspective view of a coupled inductor having a non-uniform winding terminal distribution, according to an embodiment.
Figure 3:
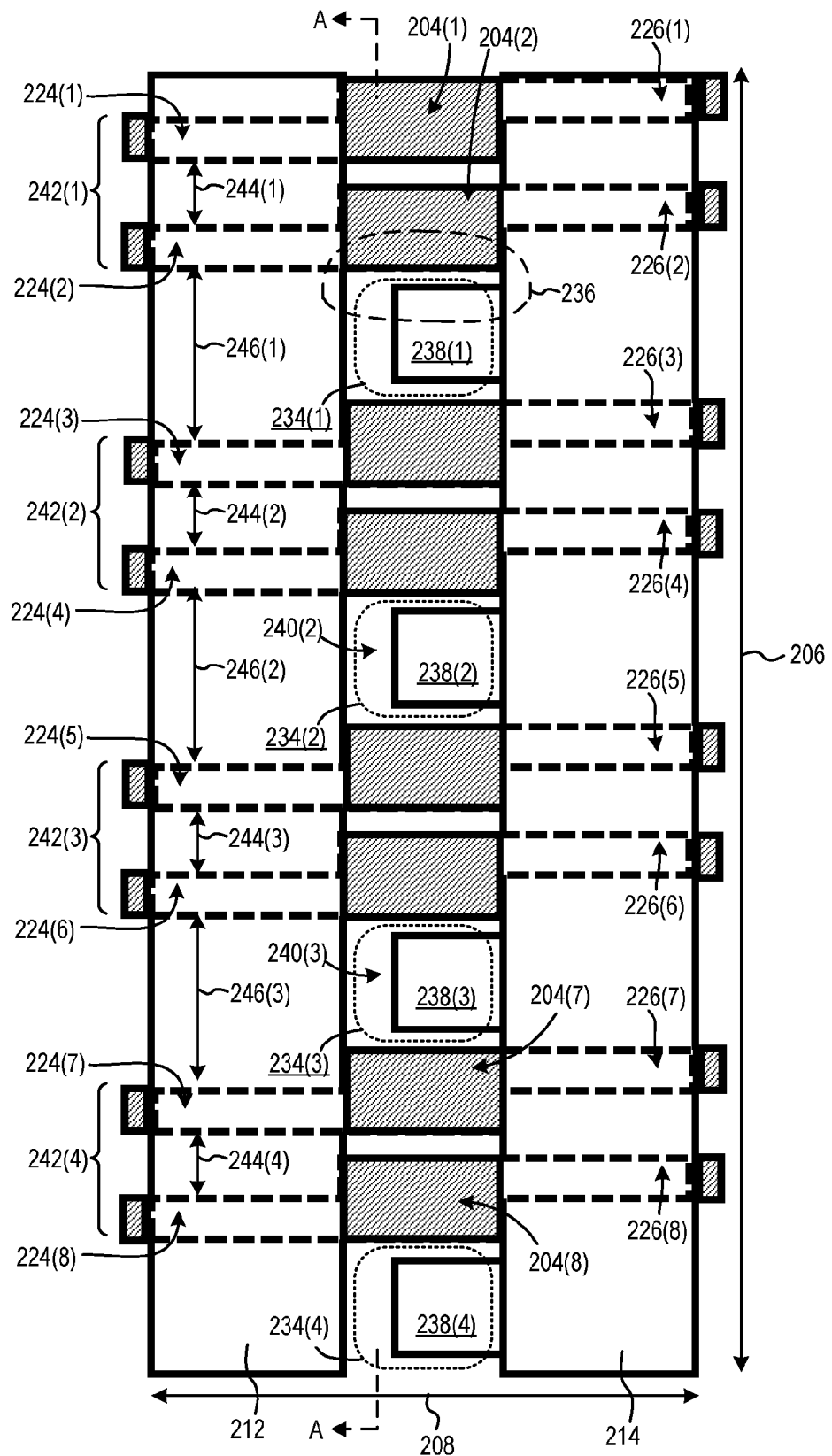
FIG. 3 shows a top plan view of the FIG. 2 coupled inductor.
Figure 4:
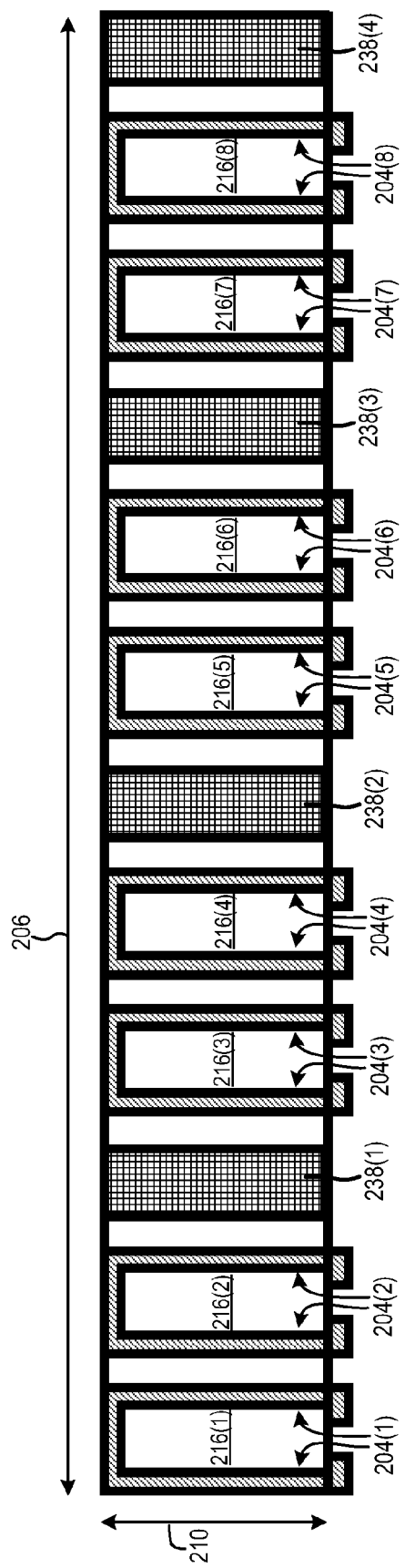
FIG. 4 shows a cross-sectional view of the FIG. 2 coupled inductor.
Figure 5:
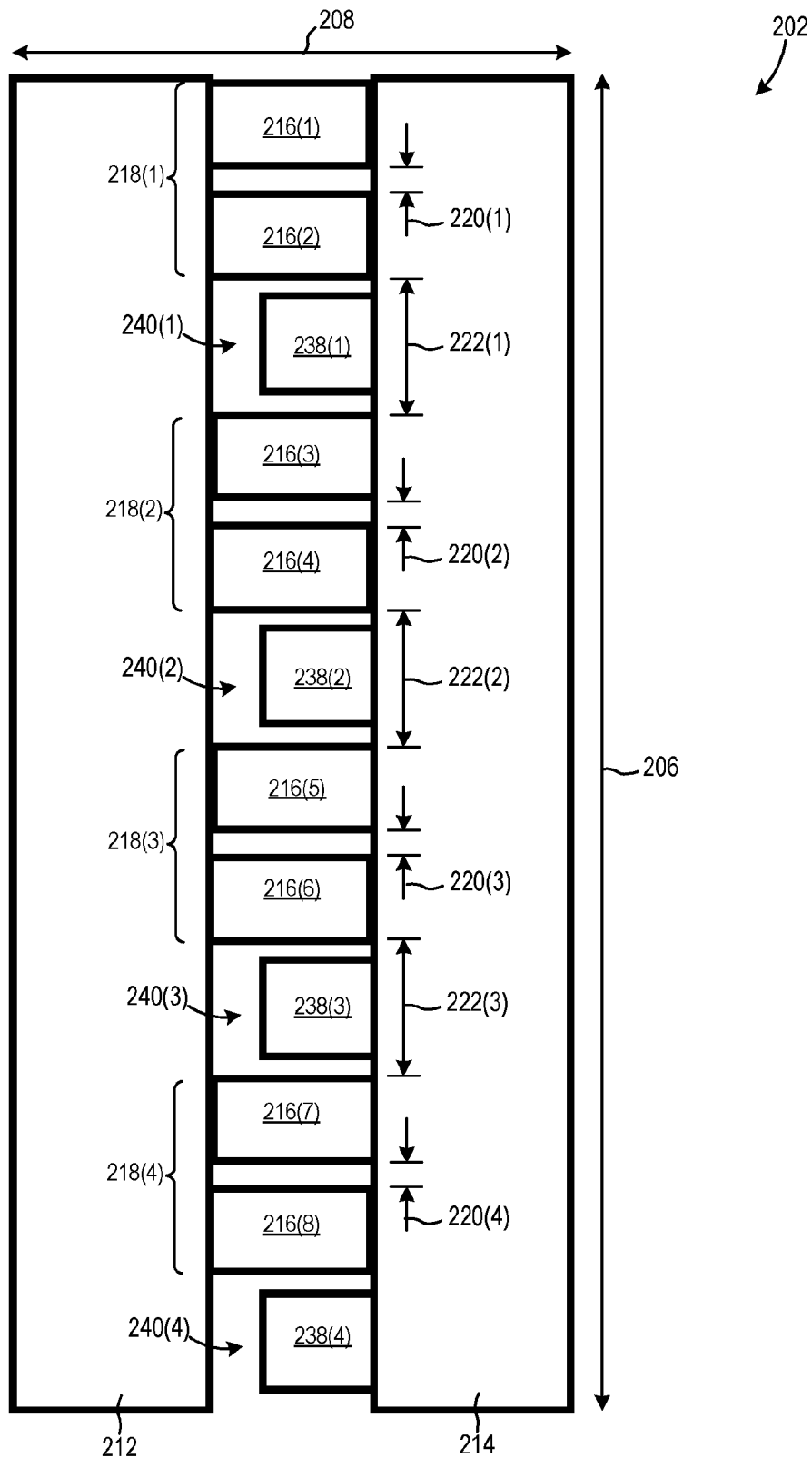
FIG. 5 shows a top plan view of a magnetic core of the FIG. 2 coupled inductor.

FIG. 2 shows a perspective view of a coupled inductor 200 having a non-uniform winding terminal distribution. Coupled inductor 200 includes a ladder magnetic core 202 and N windings 204. Although N is shown as being equal to eight, N could alternately be any integer greater than three. Magnetic core 202 has a length 206, a width 208, and a height 210. FIG. 3 shows a top plan view of coupled inductor 200, with the outlines of windings 204 shown by dashed lines where obscured by core 202. FIG. 4 shows a cross-sectional view of coupled inductor 200 taken along line A-A of FIG. 3, and FIG. 5 shows a top plan view of magnetic core 202. In this document, not all instances of every element are labeled in the figures to promote illustrative clarity. For example, only some instances of windings 204 are labeled in FIG. 3.

Figure 6:
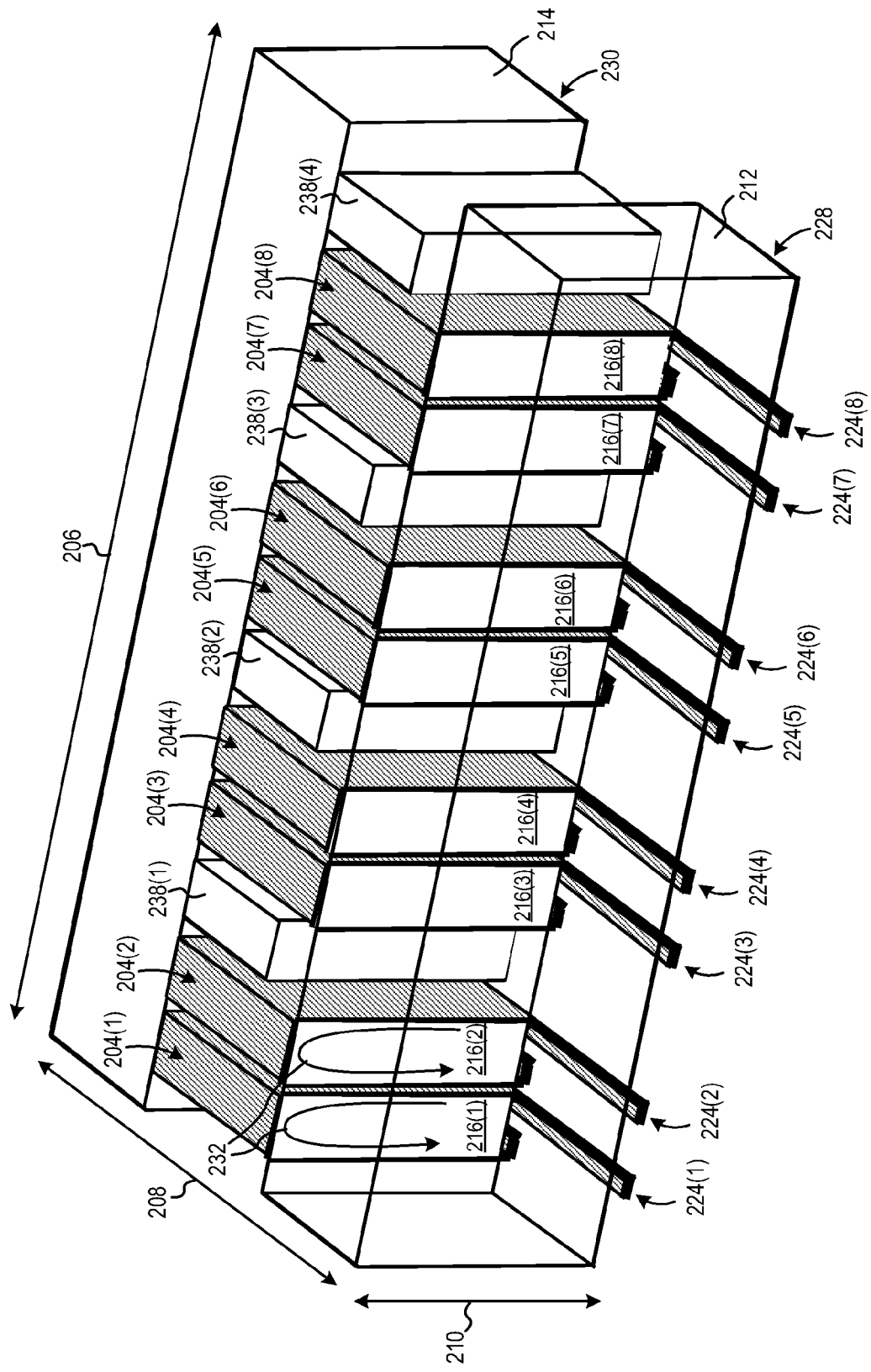
FIG. 6 shows a perspective view of the FIG. 2 coupled inductor with a rail of the magnetic core shown in outline form.

Magnetic core 202 is formed of a magnetic material, such as a ferrite material or a powdered iron material. Magnetic core 202 includes first and second rails 212, 214 extending in the lengthwise 206 direction and separated in the widthwise 208 direction. Magnetic core 210 further includes N rungs 216, where each rung 216 joins first and second rails 212, 214 in the widthwise 208 direction, as shown in FIG. 5. FIG. 6 shows a perspective view of coupled inductor 200 with first rail 212 shown in outline form, to show the interior of coupled inductor 200. Although rails 212, 214 and rungs 216 are shown as discrete magnetic elements, two or more of these magnetic elements may be combined without departing from the scope hereof. Furthermore, in some embodiments, magnetic core 202 is a single-piece magnetic core that is formed, for example, by molding magnetic material in a ladder shape.

Rungs 216 are divided into at least two separate groups 218, where each group 218 includes two or more of the N rungs 216, as shown in FIG. 5. Adjacent rungs 216 within a common group 218 are separated by a lengthwise separation distance 220. For instance, rungs 216(1) and 216(2) of group 218(1) are separated by a separation distance 220(1), and rungs 216(3) and 216(4) of group 218(2) are separated by a separation distance 220(2). Adjacent rungs 216 of different groups 218, in contrast, are separated by a lengthwise separation distance 222. For instance, rungs 216(2) and 216(3) are separated by a separation distance 222(1), and rungs 216(4) and 216(5) are separated by a separation distance 222(2). Each separation distance 220 is smaller than each separation distance 222, so that adjacent rungs within groups 218 are substantially closer together than adjacent rungs of different groups 218. For example, rung 216(2) is substantially closer, in the lengthwise 206 direction, to rung 216(1) than to rung 216(3). As another example, rung 216(3) is substantially closer, in the lengthwise direction, to rung 216(4) than to rung 216(2).

Figures 7, 8:
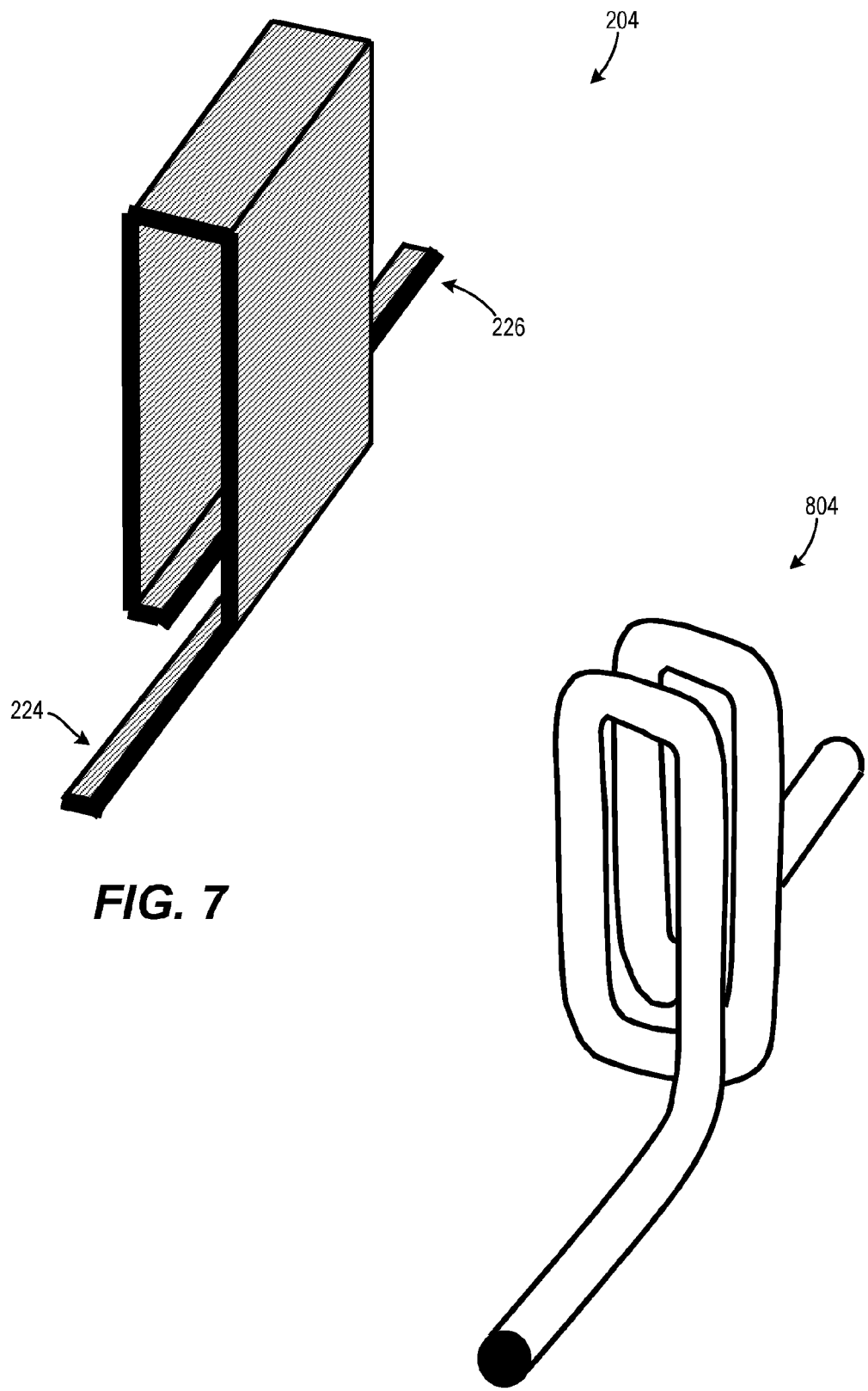
FIG. 7 shows a perspective view of a winding of the FIG. 2 coupled inductor.
FIG. 8 shows a perspective view of a winding of certain alternate embodiments of the FIG. 2 coupled inductor.

Opposing ends of each winding 204 form respective solder tabs 224, 226, as shown, for example, in FIG. 3. Solder tabs 224, 226 serve as terminals for winding 204. Solder tabs 224, 226 are disposed at least partially on bottom outer surfaces 228, 230 of first and second rails 212, 214, respectively. However, in some alternate embodiments, one or more of solder tabs 224, 226 are replaced with a different terminal type, such as a through-hole pin or a socket pin. FIG. 7 shows a perspective view of one winding 204 instance.

Each winding 204 is wound around a respective rung 216 such that current flowing into each winding's first solder tab 224 flows around the winding's respective rung 216 in a common direction, as seen when looking cross-sectionally in the widthwise 208 direction. For example, current flowing into each winding's first solder tab 224 flows around the winding's respective rung 216 in a counterclockwise direction 232, as seen when looking cross-sectionally from first rail 212 towards second rail 214, as shown in FIG. 6. This winding configuration causes coupled inductor 200 to have inverse magnetic coupling, when either all first solder tabs 224 or all second solder tabs 226 are connected to respective switching nodes. Inverse magnetic coupling is required to achieve advantages associated with using coupled inductors, instead of discrete inductors, in switching power converter applications.

Spaces 234 within ladder magnetic core 202, but outside of groups 218, provide leakage magnetic flux paths, thereby contributing to leakage inductance of windings 204 (see FIG. 3). For example, dashed line 236 symbolically illustrates how space 234(1) provides a leakage magnetic flux path for winding 204(2), although space 234(1) also provides leakage magnetic flux paths for other windings 204. The fact that spaces 234 are within magnetic core 202 helps contain leakage magnetic flux within coupled inductor 200, thereby helping minimize the likelihood of electromagnetic interference from leakage magnetic flux. Although not required, magnetic core 202 typically further includes N leakage elements or "teeth" 238, where each tooth 238 at least partially bridges a widthwise 208 separation distance between first and second rails 212, 214. Leakage teeth 238 and rung groups 218 are disposed in an alternating manner along length 206, as shown in FIG. 5. Such leakage tooth 238 distribution helps achieve short paths for leakage fluxes from multiple windings, which minimizes core losses.

Leakage teeth 238 decrease the leakage magnetic flux path reluctance in spaces 234, thereby promoting high and controllable leakage inductance values. Each leakage tooth 238 is typically separated from first rail 212 by a gap 240. Gaps 240 help prevent magnetic saturation at high current levels, and gap 240 dimensions can be adjusted during coupled inductor design to tune leakage inductance values. For example, leakage inductance can be increased by decreasing a thickness of gaps 240 in the widthwise 208 direction. Additionally, winding 204 leakage inductance values can be adjusted during inductor 200 design by varying the configuration, such as the size and/or composition, of leakage teeth 238.

In some alternate embodiments, such as where leakage teeth 238 are formed of a magnetic material with a distributed air gap, leakage teeth 238 completely bridge the widthwise separation distance between first and second rails 212, 214. Additionally, leakage teeth 238 could alternately extend from first rail 212 toward second rail 214, such that gaps 240 separate leakage teeth 238 from second rail 214. Furthermore, each leakage tooth 238 could be split into first and second sub-teeth (not shown) extending into space 234 from rails 212 and 214, respectively, such that a gap separates the sub-teeth in the widthwise 208 direction.

The non-uniform rung 216 distribution along length 206 causes solder tabs 224, 226 to be non-uniformly distributed along length 206. Solder tabs 224 are divided into different groups 242 of two or more solder tabs 224, as shown in FIGS. 2 and 3. Lengthwise separation distances 244 between adjacent solder tabs 224 within each group 242 are smaller than lengthwise separation distances 246 between adjacent solder tabs 224 of different groups. For example, solder tab 224(2) is substantially closer in the lengthwise 206 direction to solder tabs 224(1) than to solder tab 224(3), and solder tab 224(3) is substantially closer in the lengthwise 206 direction to solder tab 224(4) than to solder tab 224(2). Such non-uniform solder tab distribution may facilitate aligning the solder tabs with an integrated circuit's terminals, such as discussed below with respect to FIG. 32.

The configuration of magnetic core 202 enables the majority of inductor volume to be occupied by magnetic elements, namely rails 212, 214, rungs 216, and leakage teeth 238, thereby promoting large magnetic core cross-sectional area per unit volume. Large magnetic core cross-sectional area promotes low core losses in magnetic core 202.

Although coupled inductor 200 is shown with two rungs 216 per rung group 218, the number of rungs 216 per group 218 could be increased. For example, in certain alternate embodiments, N is equal to nine, and the nine rungs 216 are divided into three groups 218, where each group includes three rungs. Furthermore, although windings 204 are shown as being single-turn foil windings, windings 204 could be modified, as long as first solder tabs 224, or analogous terminals such as through-hole pins, are non-uniformly distributed along length 206. For example, in some alternate embodiments, windings 204 are multi-turn windings, which promote large inductance values with small core losses. For example, FIG. 8 shows a perspective view of a two-turn wire winding 804, which is used in place of single-turn foil windings 204 in some alternate embodiments of coupled inductor 200. Opposing ends of winding 804 are, for example, coupled to terminals (not shown), such as solder tabs or through-hole pins. Moreover, some alternate embodiments include two or more separate windings wound at least partially around each rung 216. The separate windings of each rung 216 are connected, for example, by external conductors, such as PCB traces, to form a multi-turn winding, such as using techniques similar to those taught in U.S. Pat. No. 7,994,888 to Ikriannikov, which is incorporated by reference.

Multiple instances of coupled inductor 200 could be joined. For example, two instances of coupled inductor 200 could be joined in the lengthwise 206 direction to form a coupled inductor including sixteen windings 204.

Figure 9:
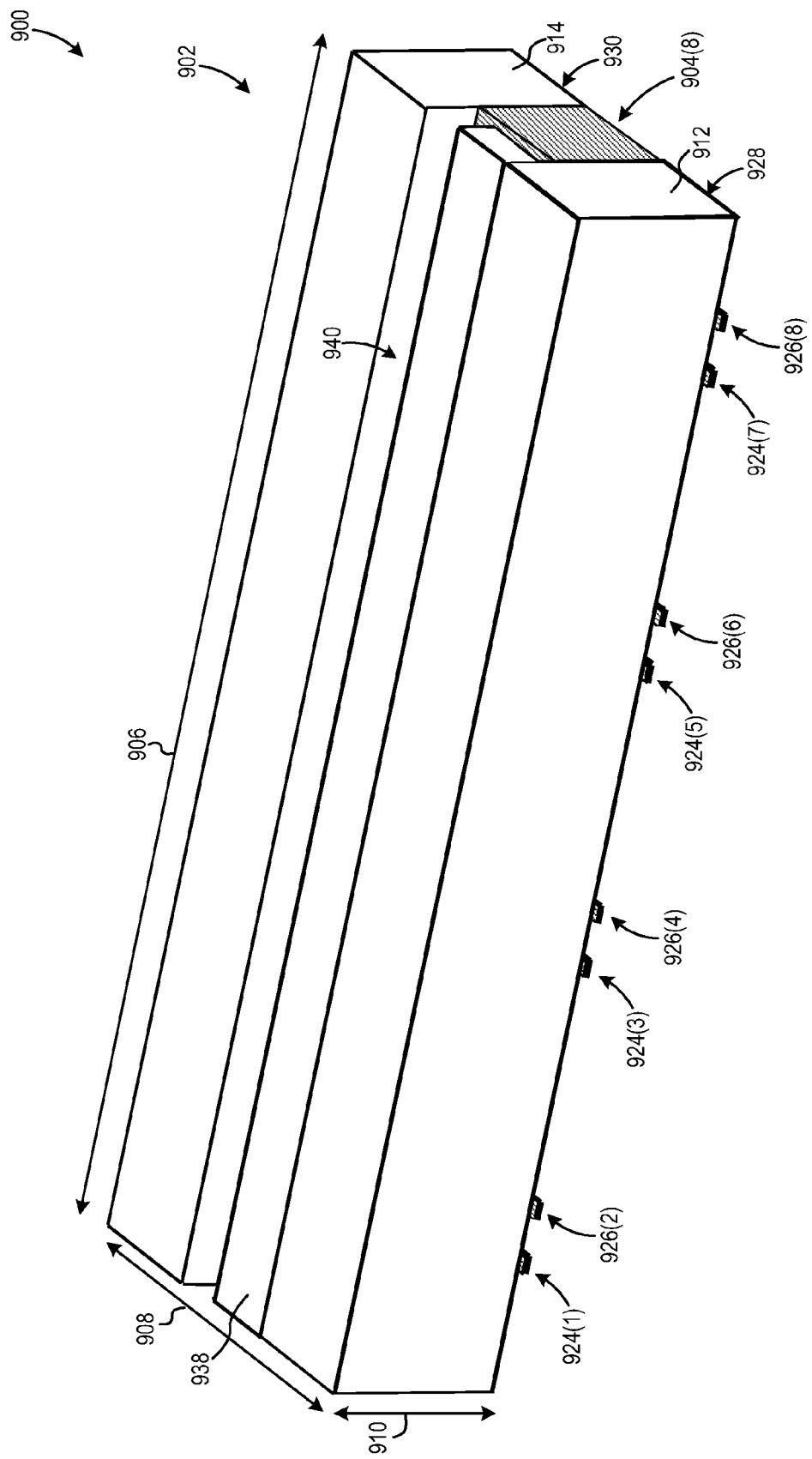
FIG. 9 shows a perspective view of another coupled inductor having a non-uniform winding terminal distribution, according to an embodiment.

FIG. 9 shows a perspective view of another coupled inductor 900 having a non-uniform winding terminal distribution. Coupled inductor 900 includes a ladder magnetic core 902 and N windings 904. Although coupled inductor 900 is shown with N being equal to eight, N could alternately be any integer greater than one without departing from the scope hereof.

Figure 10:
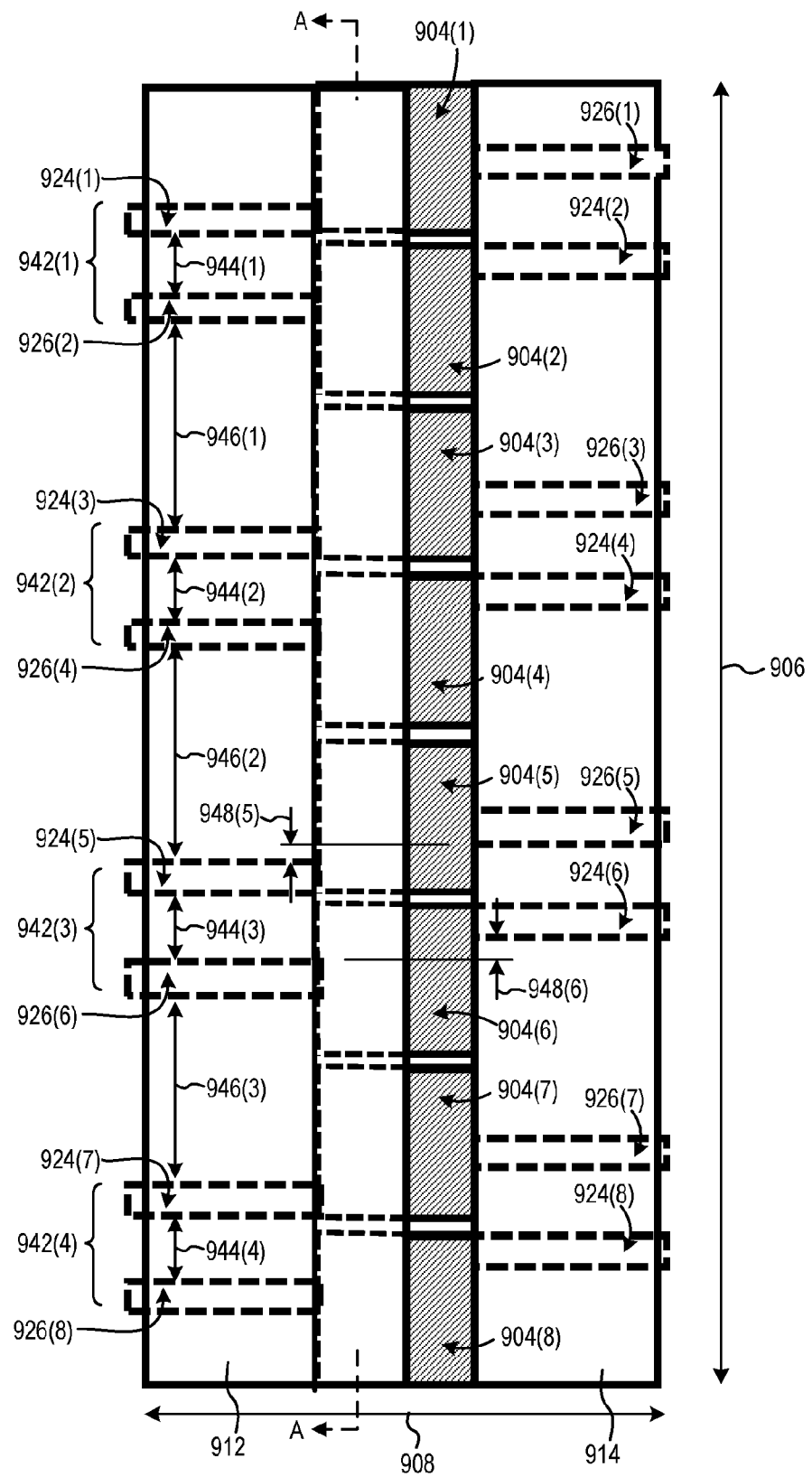
FIG. 10 shows a top plan view of the FIG. 9 coupled inductor.
Figure 11:
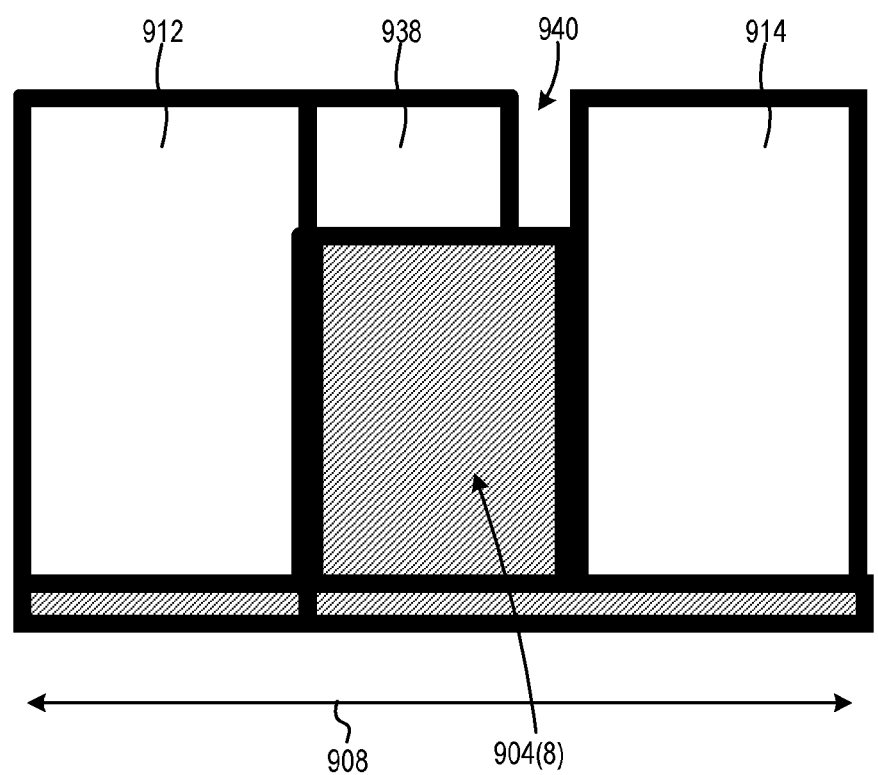
FIG. 11 shows a right side elevational view of the FIG. 9 coupled inductor.
Figure 12:
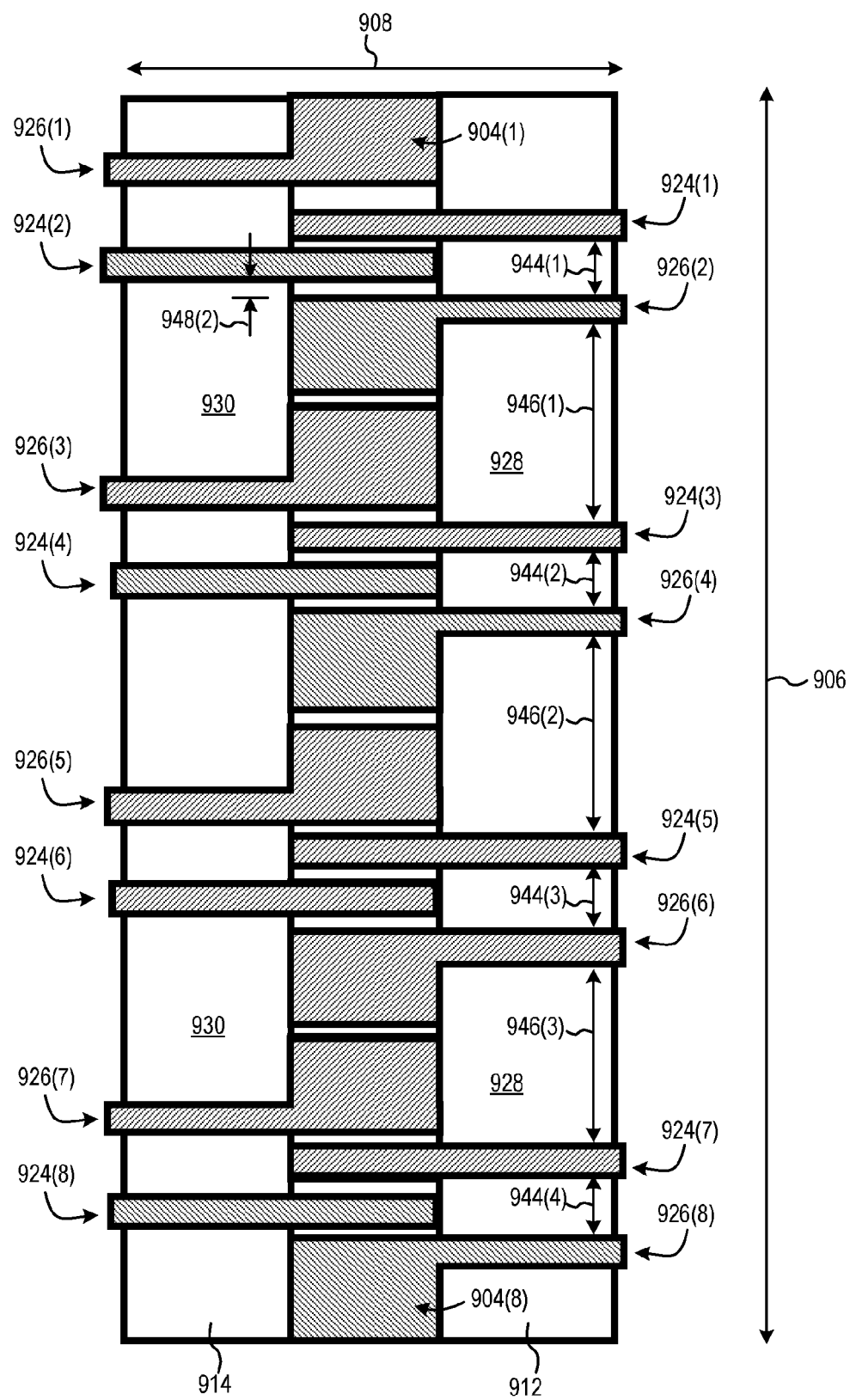
FIG. 12 shows a bottom plan view of the FIG. 9 coupled inductor.
Figure 13:
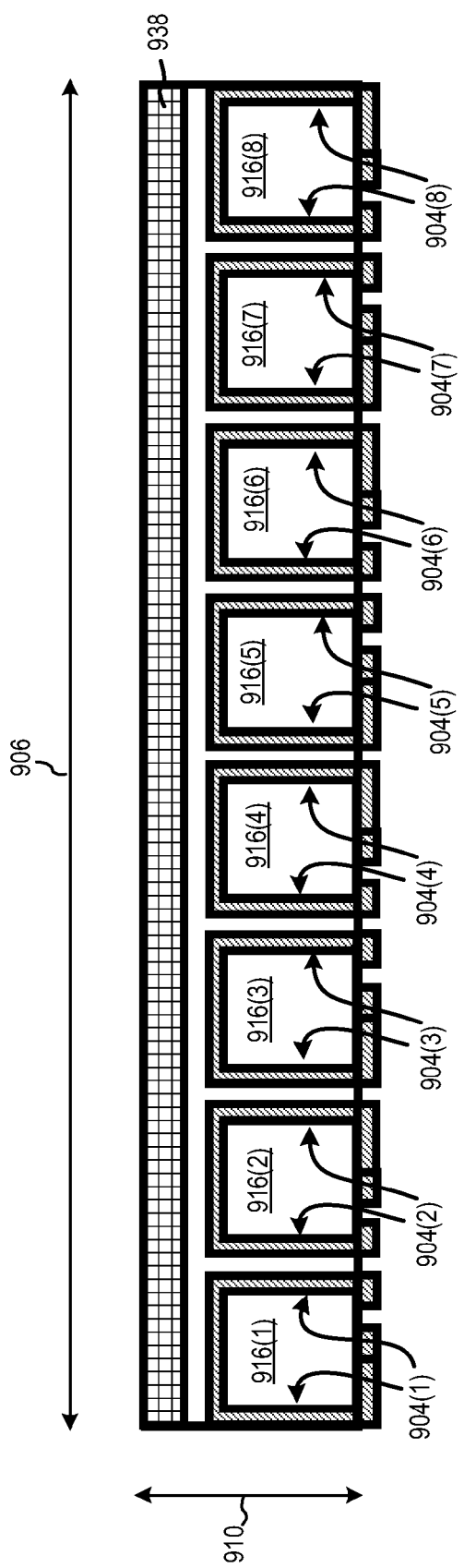
FIG. 13 shows a cross-sectional view of the FIG. 9 coupled inductor.

Magnetic core 902 has a length 906, a width 908, and a height 910. FIG. 10 shows a top plan view of coupled inductor 900, where the outlines of windings 904 are shown by dashed lines where obscured by magnetic core 902. FIG. 11 shows a right side elevational view, FIG. 12 shows a bottom plan view, and FIG. 13 shows a cross-sectional view taken along line A-A of FIG. 10.

Figure 14:
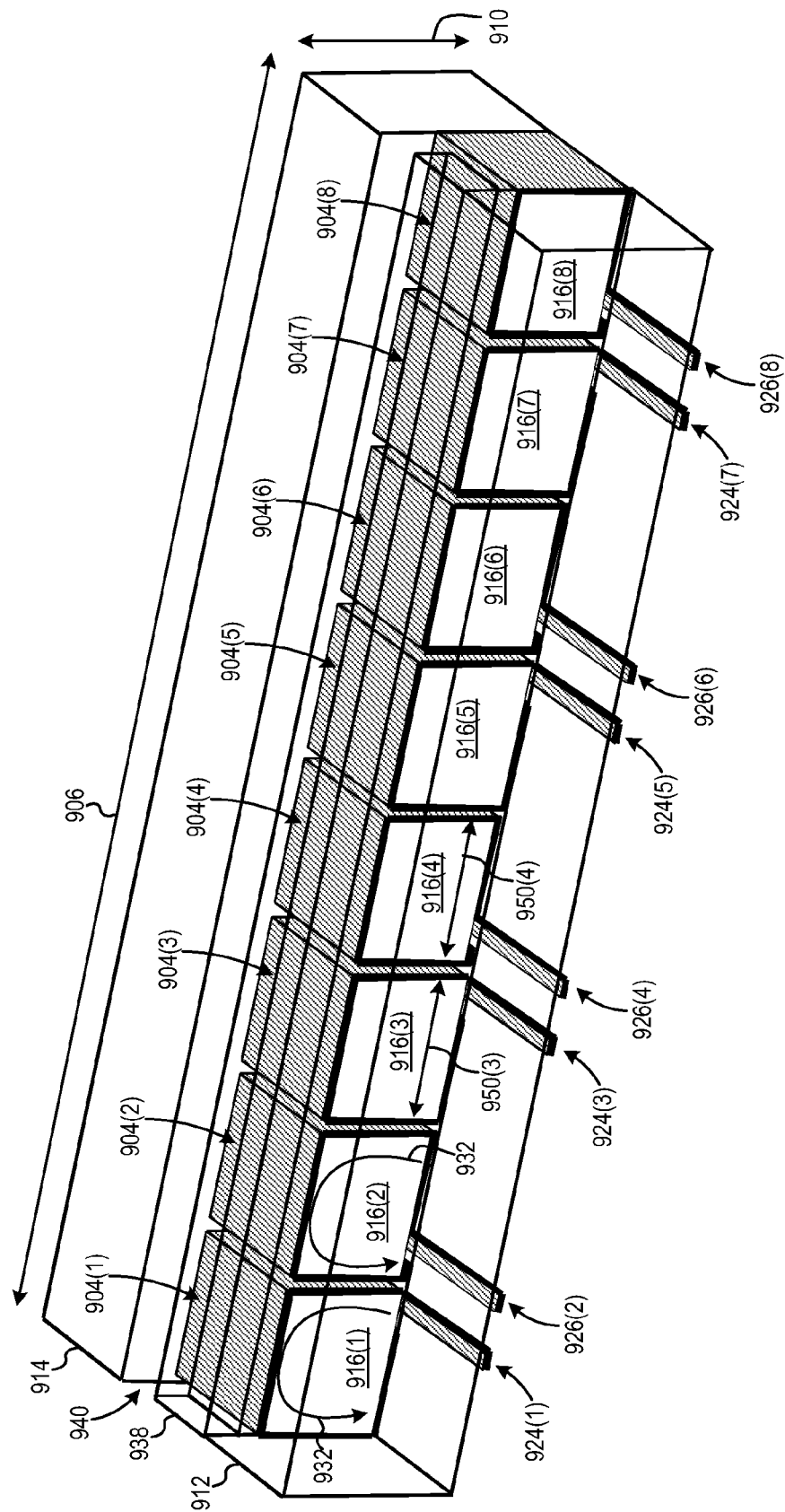
FIG. 14 shows a perspective view of the FIG. 9 coupled inductor with a first rail and a leakage element of the inductor's magnetic core shown in outline form.

Magnetic core 902 is formed of a magnetic material, such as a ferrite material or a powdered iron material. Magnetic core 902 includes first and second rails 912, 914 extending in the lengthwise 906 direction and joined by N rungs 916, in a manner similar to magnetic core 202 of coupled inductor 200. Magnetic core 902 further includes a leakage tooth 938 bridging a widthwise 908 separation distance between rails 912, 914. FIG. 14 shows a perspective view of coupled inductor 900 with first rail 912 and leakage tooth 938 shown in outline form, to show the inductor's interior.

Leakage tooth 938 is disposed over rungs 916 in the heightwise 910 direction, and a gap 940 typically separates leakage tooth 938 from second rail 914. However, in some alternate embodiments, such as where leakage tooth 938 is formed of a distributed air gap magnetic material, leakage tooth 938 completely bridges the widthwise separation distance between first and second rails 912, 914. Additionally, magnetic core 902 could be modified such that leakage tooth 938 extends from second rail 914 towards first rail 912, such that tooth 938 is separated from rail 912 by gap 940. Furthermore, leakage tooth 938 could be split into first and second sub-teeth (not shown) extending towards each other from rails 912 and 914, respectively, such that a gap separates the sub-teeth in the widthwise 908 direction. Moreover, although leakage tooth 938 is shown as extending along the entire length 906 to promote substantially equal leakage inductance values among windings 904, in some alternate embodiments, leakage tooth 938 only extends along part of length 906. Although rails 912, 914, rungs 916, and leakage tooth 938 are shown as being discrete magnetic elements, two or more of these magnetic elements may be combined without departing from the scope hereof. Furthermore, in some embodiments, magnetic core 908 is a single-piece magnetic core.

Leakage tooth 938 provides a leakage magnetic flux path and therefore contributes to winding 904 leakage inductance. Leakage tooth 938 also electrically shields the top of windings 904. Leakage inductance values of windings 904 can be adjusted during inductor 900 design by varying the configuration, such as the size and/or composition, of leakage tooth 938, or by varying the widthwise 908 thickness of gap 940.

Opposing ends of each winding 904 form respective solder tabs 924, 926, which are structurally capable of surface mount soldering to a common substrate, such as a PCB. See, for example, FIG. 10. Solder tabs 924, 926 of each winding 904 serve as terminals for the winding, although in some alternate embodiments, one or more of solder tabs 924, 926 are replaced with a different connector type, such as a through-hole pin or a socket pin. Solder tabs 924 are disposed on a bottom outer surface 928 of first rail 912, and solder tabs 926 are disposed on a bottom outer surface 930 of second rail 914. Solders tab 924 and 926 of a given winding 904 are separated by a lengthwise separation distance 948.

Figure 15:
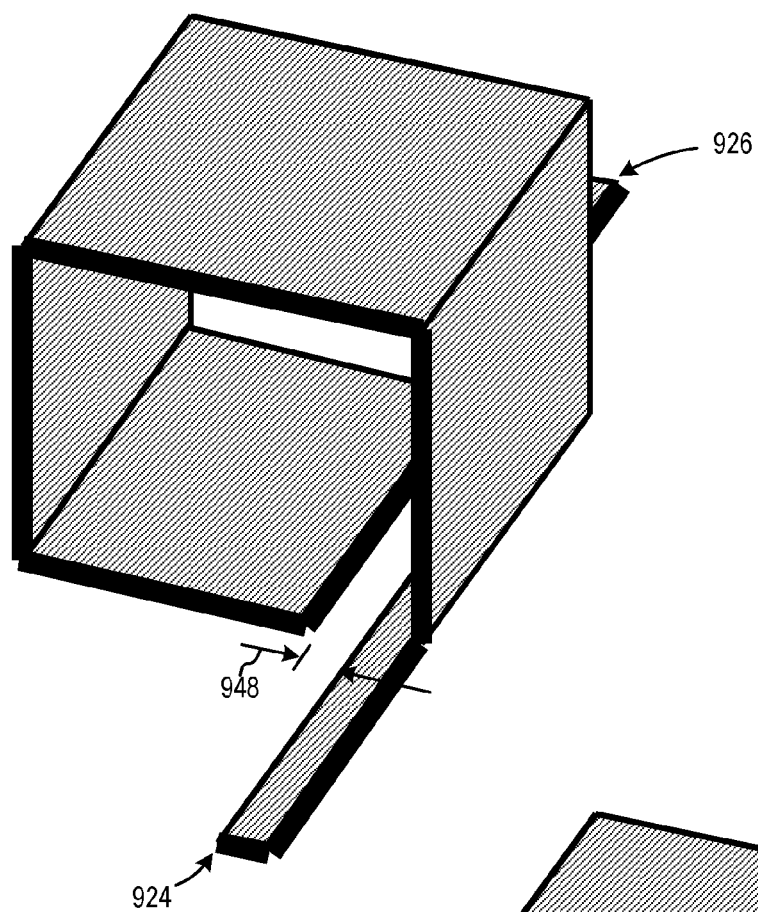
FIG. 15 shows a perspective view of a winding of the FIG. 9 coupled inductor at zero degree orientation.
Figure 16:
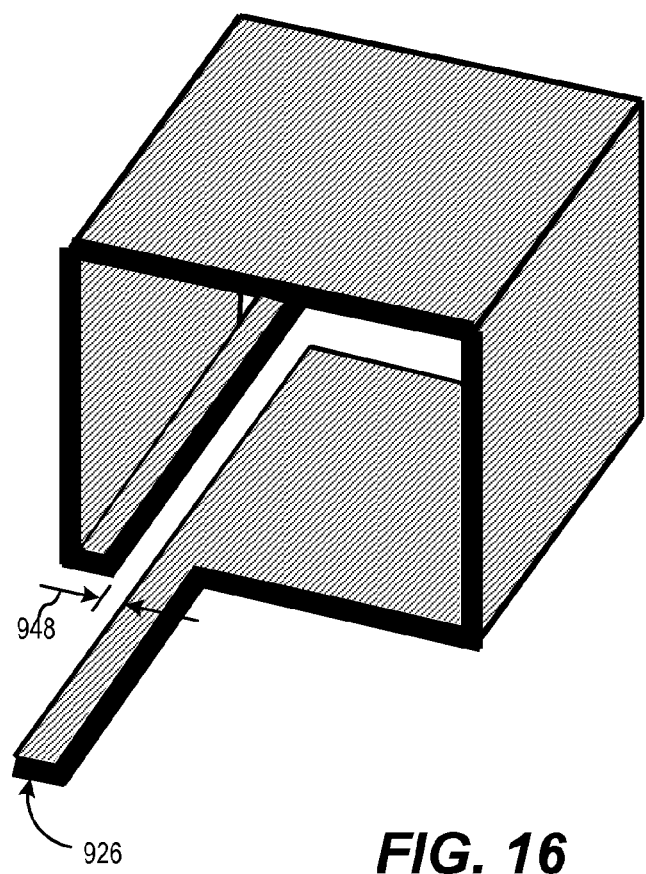
FIG. 16 shows a perspective view of a winding of the FIG. 9 coupled inductor at 180 degree orientation.

Each winding 904 typically has a common geometric shape, as shown, to promote ease of winding procurement and manufacturing simplicity. However, windings 904 are wound around respective rungs 916 with alternating opposing orientations, such that windings 904(1), 904(3), 904(5), and 904(7) have a zero degree orientation, while windings 904(2), 904(4), 904(6), and 904(8) have a 180 degree orientation. Zero degree orientation is characterized by solder tab 924 being disposed at least partially on first rail bottom outer surface 928, and solder tab 926 being disposed at least partially on second rail bottom outer surface 930. 180 degree orientation is characterized by solder tab 924 being disposed at least partially on second rail bottom outer surface 930, and solder tab 926 being disposed at least partially on first rail bottom outer surface 928. Thus, windings 904 having a 180 degree orientation are the mirror image of windings 904 having a zero degree orientation, as seen when looking in the heightwise direction. FIG. 15 shows a perspective view of a winding 904 instance at zero degree orientation, and FIG. 16 shows a perspective view of a winding 904 instance at 180 degree orientation, as seen when looking from first rail 912 towards second rail 914.

Although windings 904 have alternating opposing orientations, the windings are wound such that current flowing into each winding's terminal at first rail 912 flows around the winding's respective rung 916 in a common direction, as seen when looking cross-sectionally in the widthwise 908 direction. For example, current flowing into solder tab 924(1) of winding 904(1) flows in a counter-clockwise direction 932 around rung 916(1), and current flowing into solder tab 926(2) of winding 904(2) flows in a counter-clockwise direction 932 around rung 916(2), as seen when looking cross-sectionally from first rail 912 towards second rail 914 (see FIG. 14). This winding configuration causes coupled inductor 900 to have inverse magnetic coupling, when all terminals along first rail 912 are electrically coupled to a respective switching node.

Figure 17:
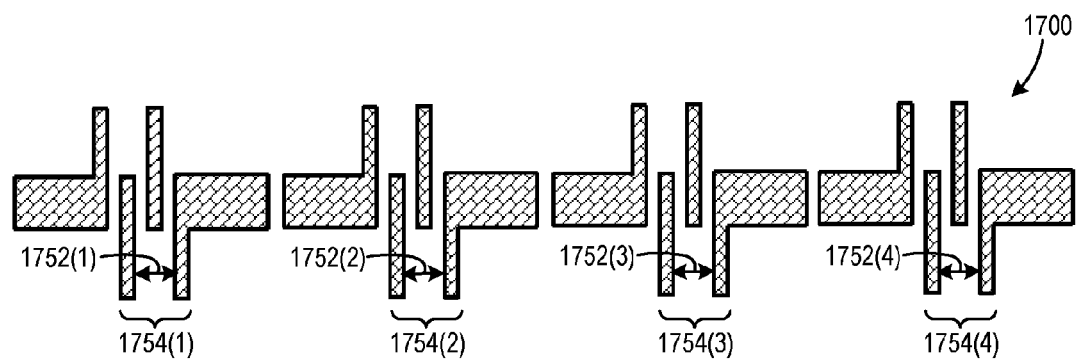
FIG. 17 shows one possible PCB footprint for use with the FIG. 9 coupled inductor, according to an embodiment.
Figure 18:
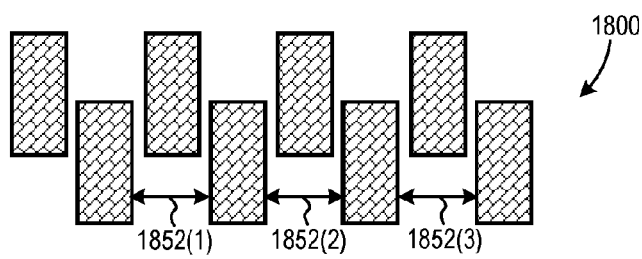
FIG. 18 shows one possible PCB footprint for use with the coupled inductor of the switching power converter of FIG. 1.

Lengthwise separation distance 948 is typically minimized so that when windings 904 are wound around rungs 916 in alternating opposing orientations, solder tabs 924, 926 of adjacent windings are grouped in pairs along first rail bottom outer surface 928. For example, in some embodiments, separation distance 948 is fifty percent or less of a rung length 950 (see, e.g., FIGS. 14-16). The solder tabs 924, 926 on first rail bottom outer surface 928 are divided into different groups 942, where each group includes two solder tabs, as shown in FIG. 10. Lengthwise separation distances 944 between adjacent solder tabs 924, 926 within each group 942 are smaller than lengthwise separation distances 946 between adjacent solder tabs of different groups. Such non-uniform solder tab distribution may facilitate aligning the solder tabs with an integrated circuit's terminals, such as discussed below with respect to FIG. 32. FIG. 17 shows a top plan view of one possible PCB footprint 1700 for use with coupled inductor 900. As shown, separation distances 1752 between adjacent winding terminal pads within each group 1754 of winding terminal pads are relatively small. In contrast, FIG. 18 shows a top plan view of one possible PCB footprint 1800 for use with coupled inductor 104 of FIG. 1. As can be seen, separation distances 1852 between adjacent winding terminals pads are relatively large.

Figure 19:
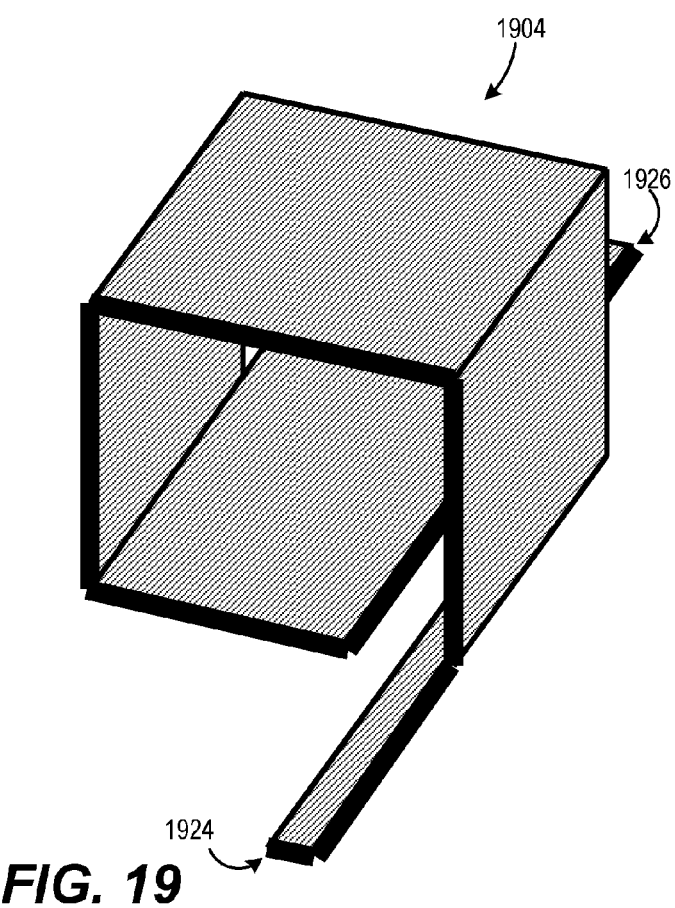
FIG. 19 shows a perspective of view of an alternative winding at zero degree orientation.
Figure 20:
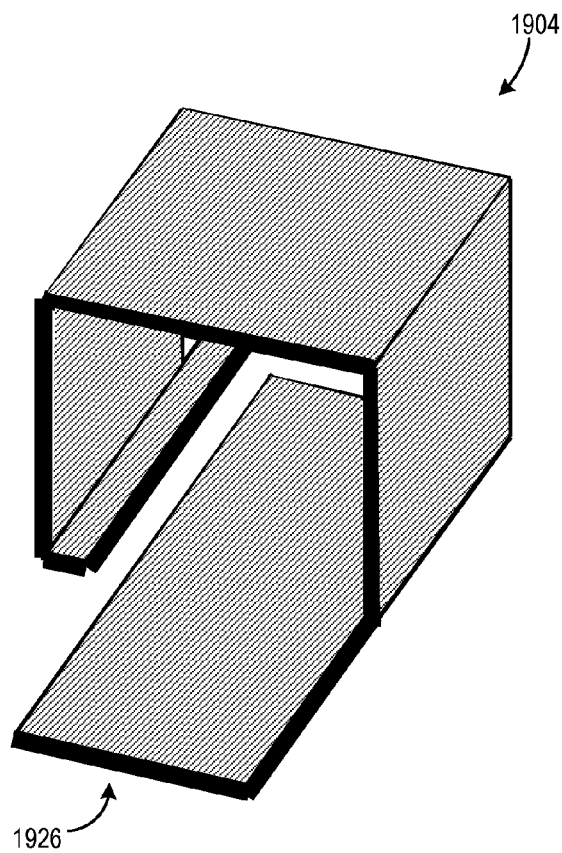
FIG. 20 shows a perspective view of the alternative winding at 180 degree orientation.
Figure 21:
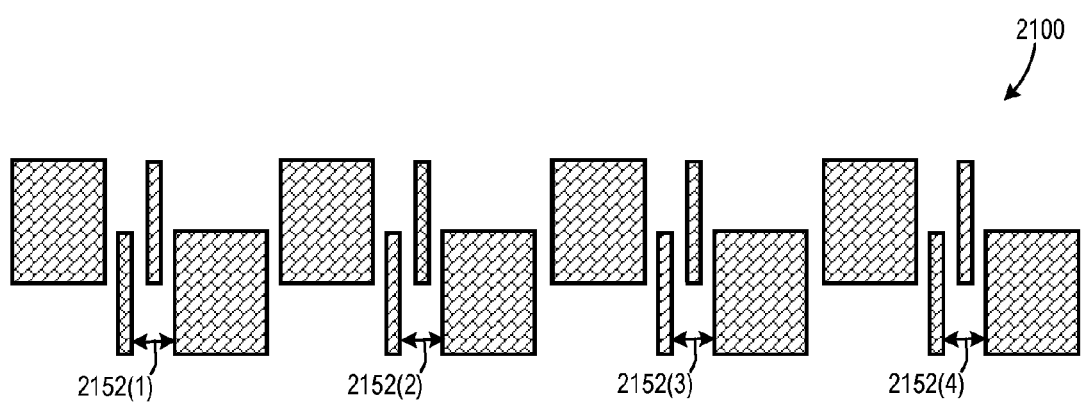
FIG. 21 shows one possible PCB footprint for use with the FIG. 9 coupled inductor and the windings of FIGS. 19 and 20, according to an embodiment.

FIG. 19 shows a perspective view of a winding 1904. Winding 1904 is similar to winding 904, but winding 1904 includes asymmetrical solder tabs 1924, 1926, such that solder tab 1926 is larger than solder tab 1924. Windings 1904 are used in place of windings 904 in some alternate embodiments of coupled inductor 900. The asymmetrical solder tabs of winding 1904 helps maximize copper cross section area, while minimizing solder tab separation, when windings 1904 are disposed in alternating opposing orientations along length 906. Large solder tabs help to minimize conduction losses when the solder tabs supplement PCB traces. FIG. 19 shows winding 1904 at zero degree orientation, and FIG. 20 shows winding 1904 at 180 degree orientation, as seen when looking from first rail 912 toward second rail 914. FIG. 21 shows a top plan view of one possible PCB footprint 2100 for use with coupled inductor 900 including windings 1904 in place of windings 904. As shown, separation distances 2152 between winding terminal pads are similar to separation distances 1752 of the FIG. 17 footprint, even though a larger portion of the PCB surface area is covered by solder tabs in the FIG. 21 footprint than in the FIG. 17 footprint.

Figure 22:
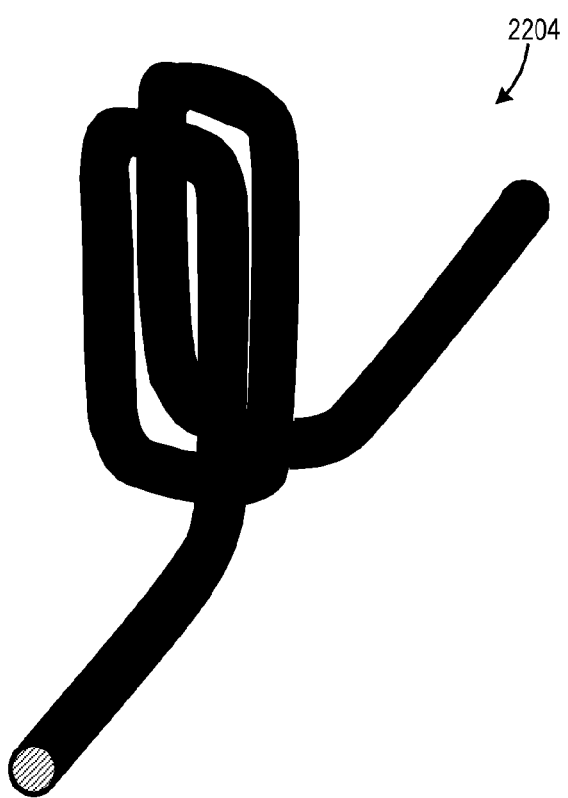
FIG. 22 shows a perspective of a winding used in certain other alternate embodiments of the FIG. 9 coupled inductor.

Although coupled inductor 900 is discussed above with respect to single-turn foil windings 904 or 1904, coupled inductor 900 could alternately include multi-turn windings, which promote large inductance values with small core losses. For example, FIG. 22 shows a perspective view of a two-turn wire winding 2204, which is used in place of single-turn foil windings 904, in some alternate embodiments of coupled inductor 900. Moreover, some alternate embodiments include two or more separate windings wound at least partially around each rung 916. The windings of each rung 916 are connected, for example, by external conductors, such as PCB board traces, to form a multi-turn winding.

Figure 23:
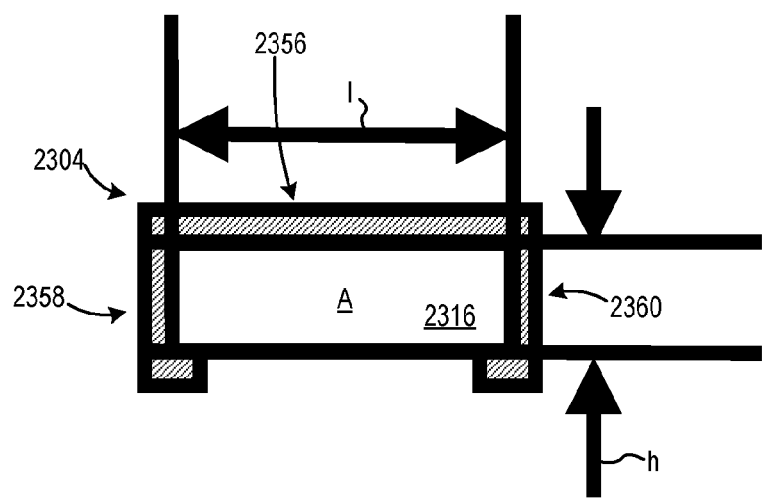
FIG. 23 shows a cross-sectional view of a winding wound around a rung, to illustrate optimization of rung and winding geometry for minimum direct current winding resistance.

In both coupled inductors 200 and 900, the geometry of ladder magnetic core rungs 216, 916 and corresponding windings 204, 904 can be optimized to minimize winding direct current (DC) resistance. FIG. 23, which shows a cross-sectional view of a winding 2304 wound around a rung 2316, helps illustrate such optimization. Winding 2304 is analogous to windings 204, 904, and rung 2316 is analogous to rungs

216, 916. DC resistance of winding 2304 is proportional to length (L) of winding 2304. Since L is affected only by winding top 2356 and sides 2358, 2360, it can be determined that L is minimized when the ratio of rung length (l) and rung height (h) is two. Accordingly, minimum DC resistance occurs when:

$$l/h=2 \qquad \text{(EQN. 1)}$$

Thus, in either coupled inductor 200 or 900, winding resistance is optionally minimized by sizing the rungs and windings so that EQN. 1 applies, although doing so may cause core length 206 to be relatively long in inductor 200. EQN. 1, however, only holds when winding 2304 is a single-turn winding. The optimal shape of rung cross-sectional area (A) becomes closer to a square as the number of turns of winding 2304 is increased.

Figure 24:
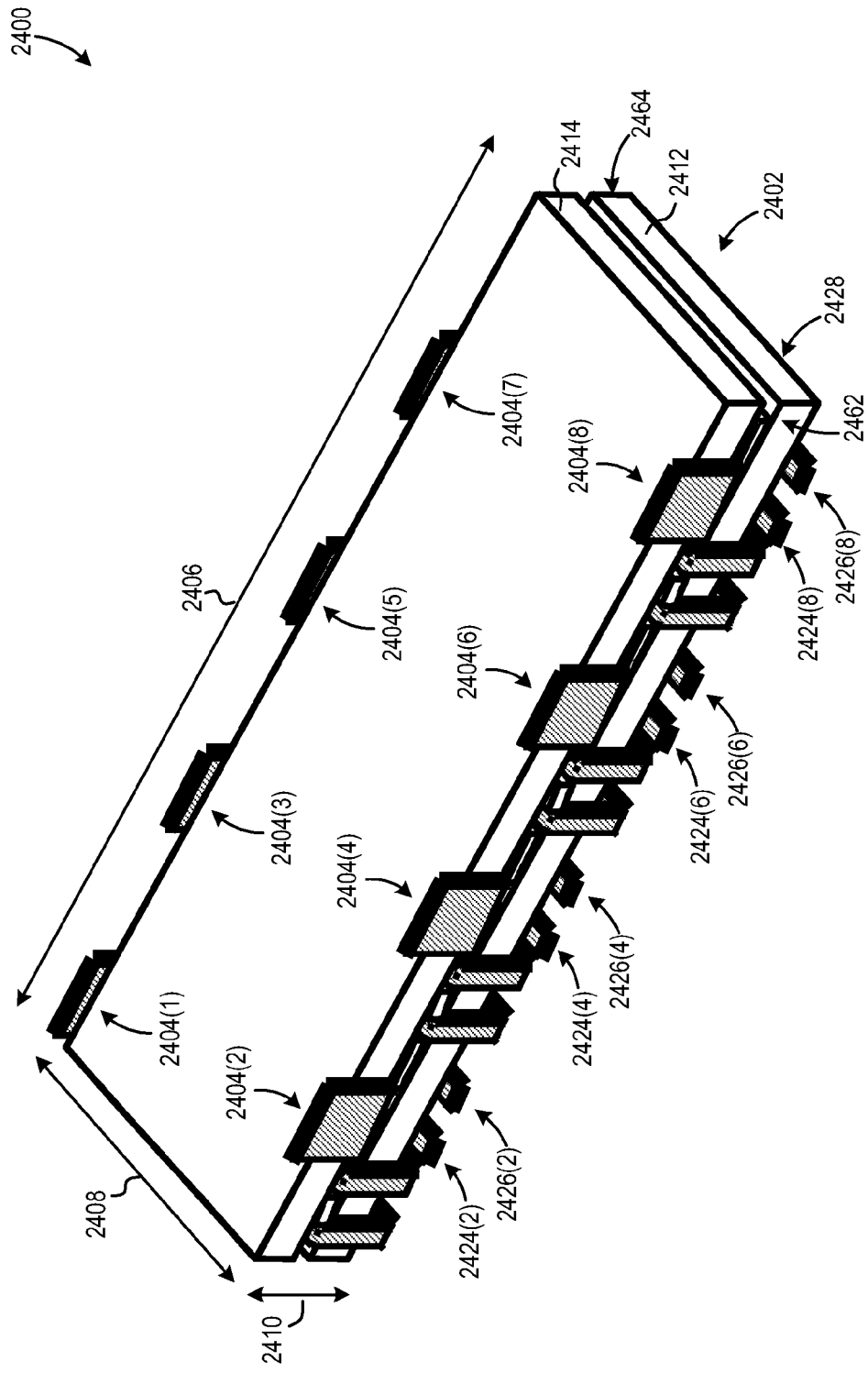
FIG. 24 shows a perspective view of yet another coupled inductor having a non-uniform winding terminal distribution, according to an embodiment.
Figure 25:
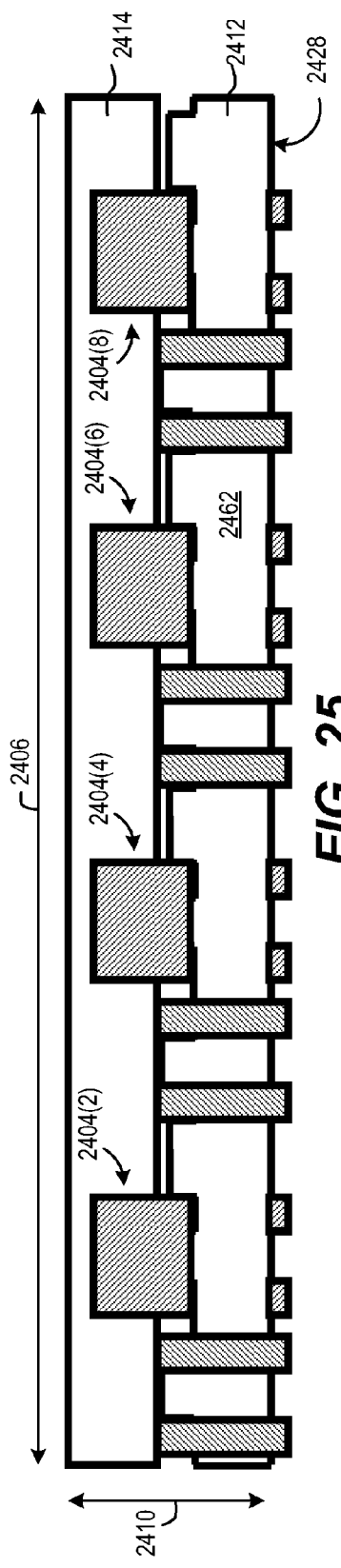
FIG. 25 shows a front elevational view of the FIG. 24 coupled inductor.
Figure 26:
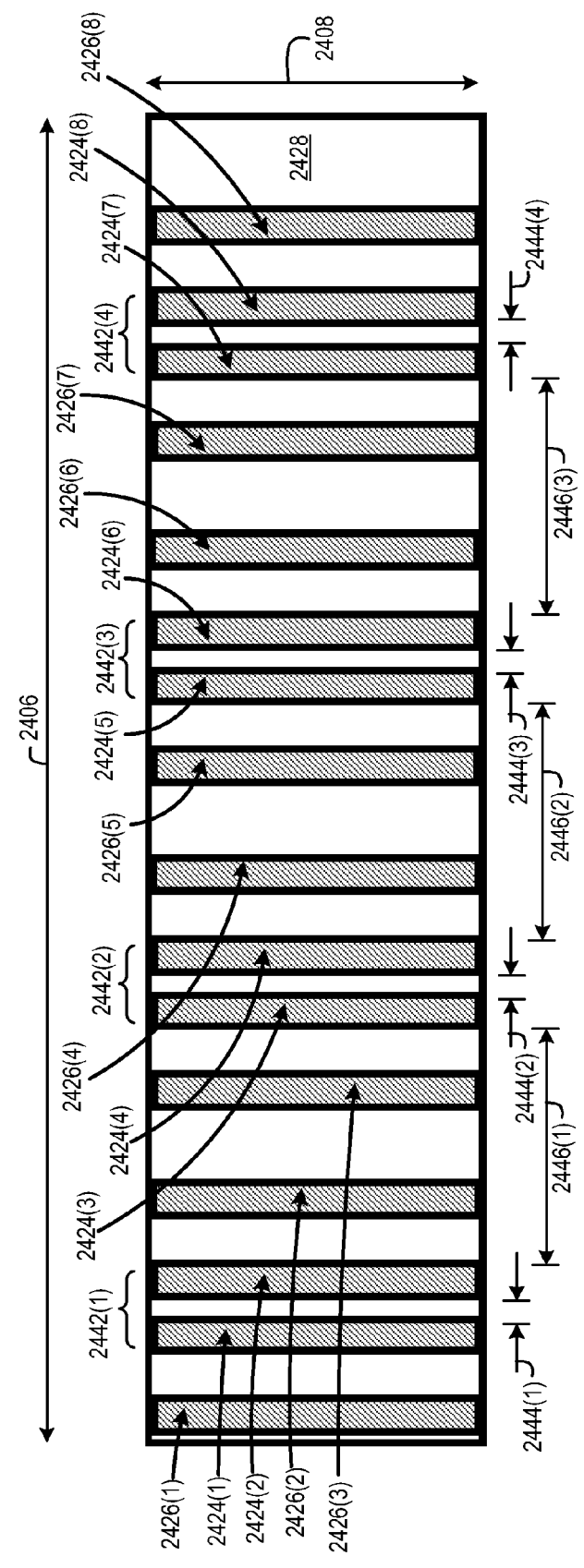
FIG. 26 shows a bottom plan view of the FIG. 24 coupled inductor.
Figure 27:
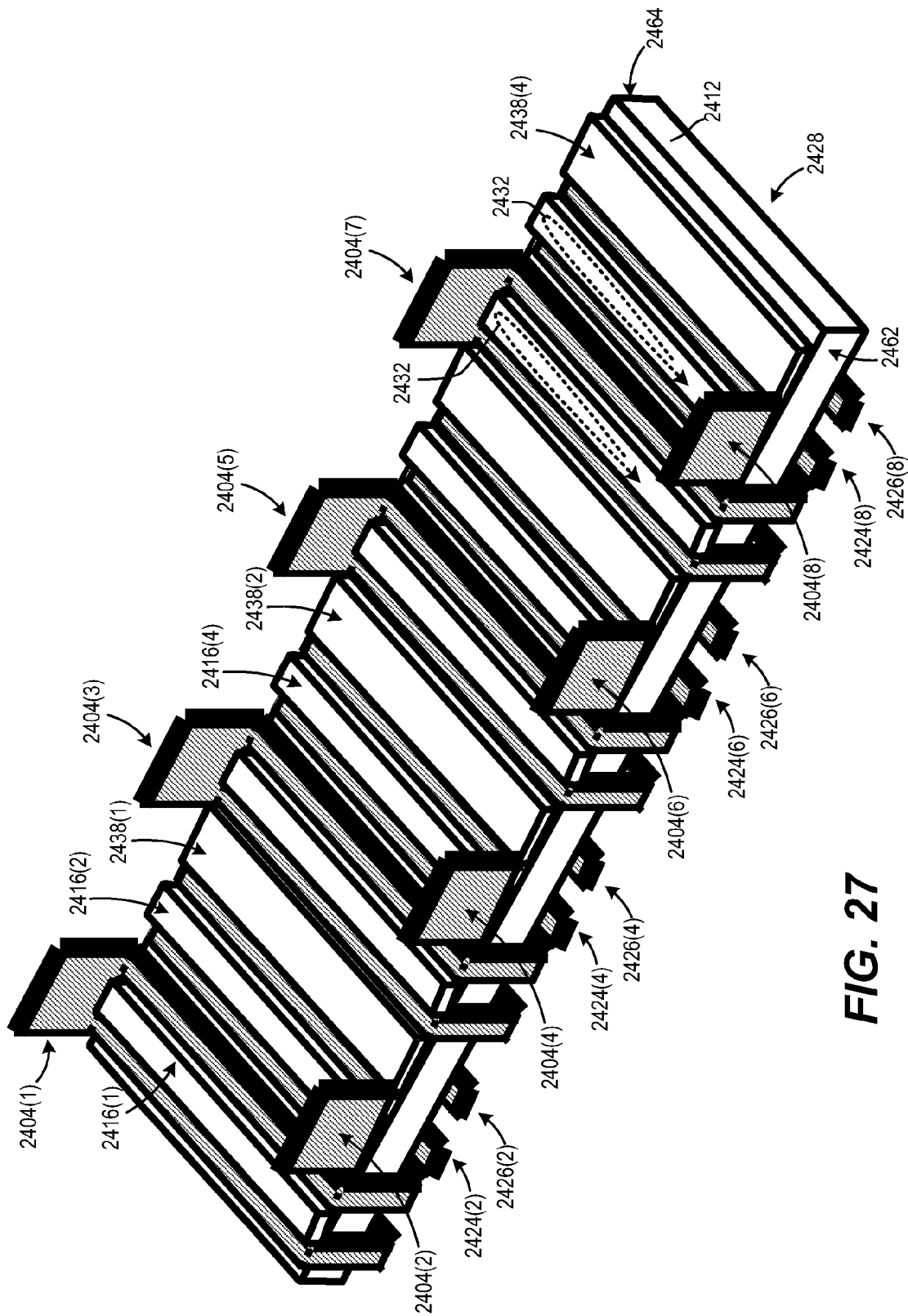
FIG. 27 shows a perspective view of the FIG. 24 coupled inductor with a portion of the magnetic core removed.

FIG. 24 shows a perspective view of another coupled inductor 2400 having a non-uniform winding terminal distribution. Coupled inductor 2400 includes a ladder magnetic core 2402 and N windings 2404. Although coupled inductor 2400 is shown with N being equal to eight, N could alternately be any integer greater than one. Magnetic core 2402 has a length 2406, a width 2408, and a height 2410. FIG. 25 shows a front elevational view of coupled inductor 2400, FIG. 26 shows a bottom plan view of the inductor, and FIG. 27 shows a perspective view of the inductor with a top rail 2412 of magnetic core 2402 removed.

Figure 28:
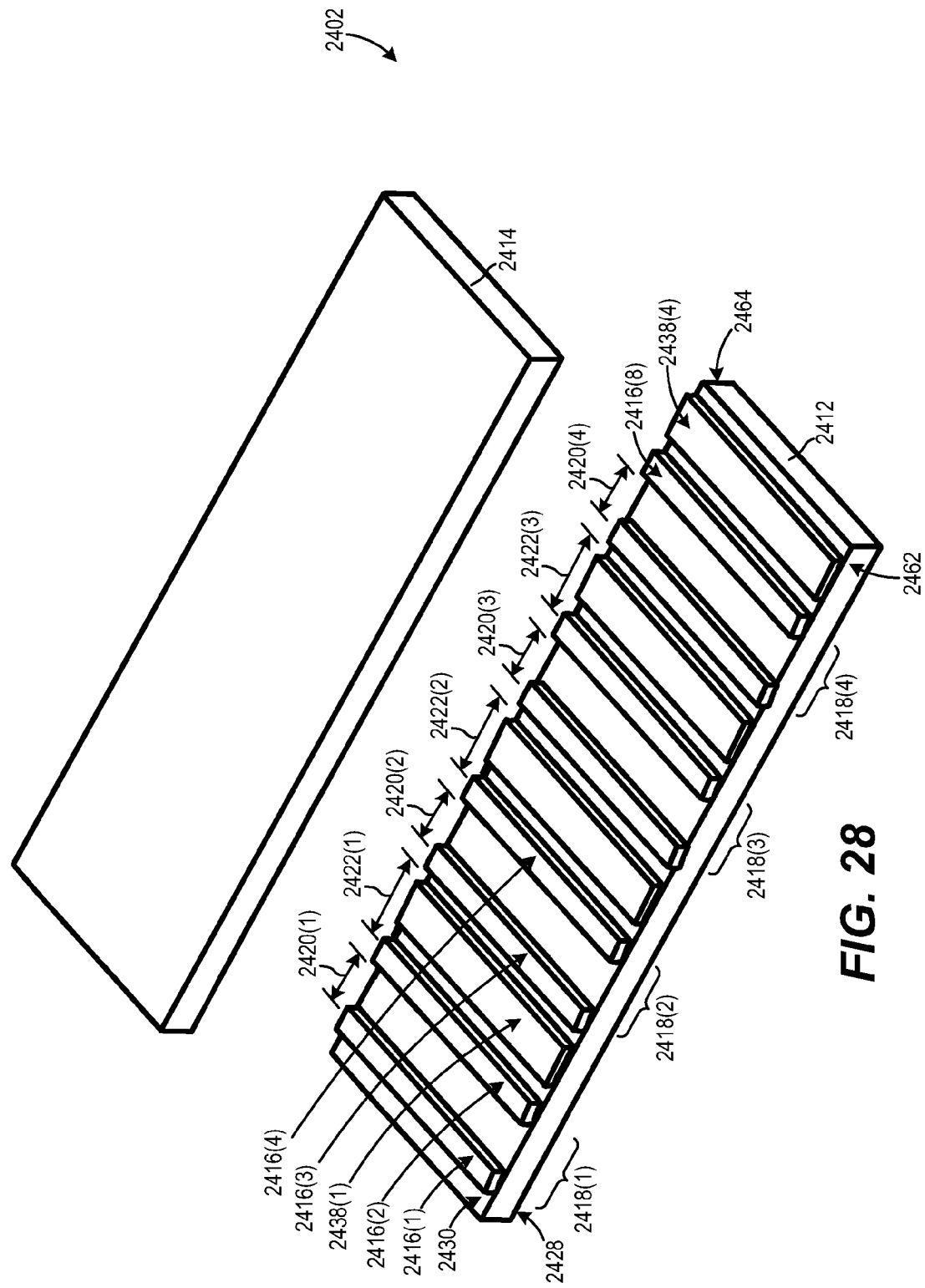
FIG. 28 shows an exploded perspective view of the magnetic core of the FIG. 24 coupled inductor.
Figure 29:
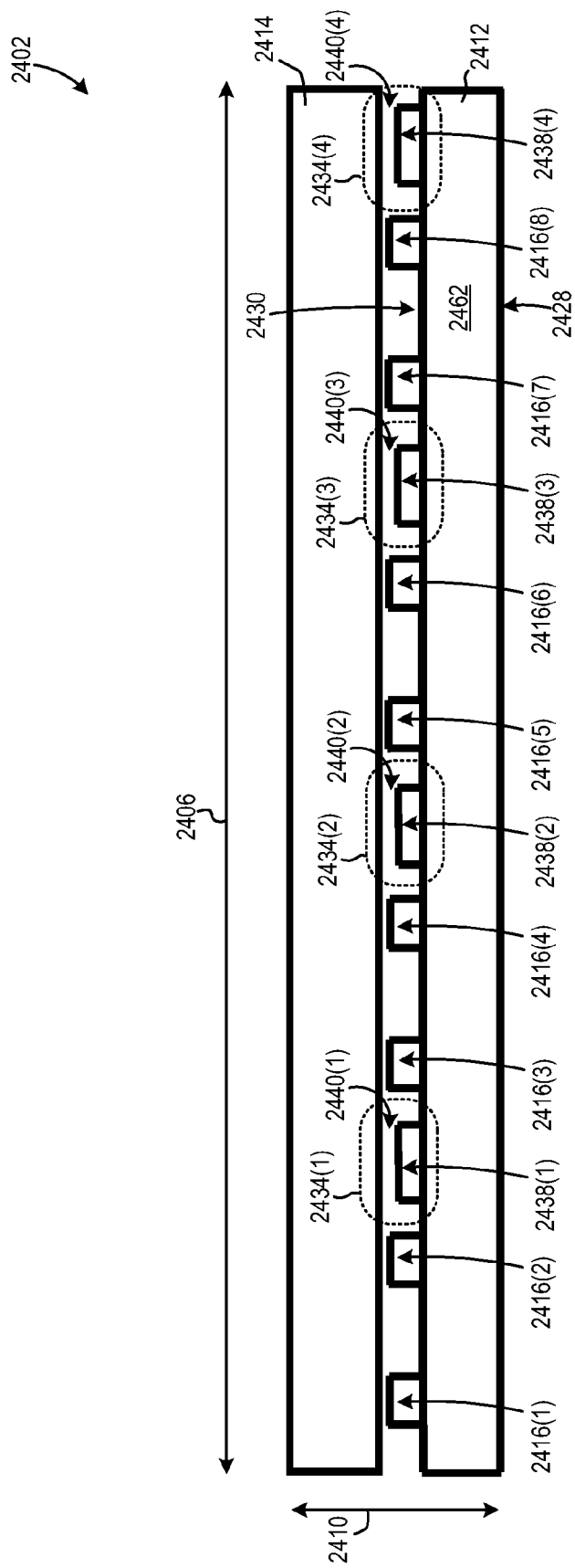
FIG. 29 shows a front elevational view of the magnetic core of the FIG. 24 coupled inductor.

FIG. 28 shows an exploded perspective view of magnetic core 2402, and FIG. 29 shows a side elevational view of magnetic core 2402. Magnetic core 2402 is formed of a magnetic material, such as a ferrite material or a powdered iron material. Magnetic core 2408 includes first and second rails 2412, 2414 and N rungs 2416. Rails 2412, 2414 extend in the lengthwise 2406 direction and are joined by rungs 2416 in the heightwise direction. First rail 2412 has opposing side outer surface 2462, 2464 separated in the widthwise 2408 direction, and first rail 2412 has opposing bottom and top outer surfaces 2428, 2430 separated in the heightwise 2410 direction. Rungs 2416 join first rail 2412 at top outer surface 2430. Although rails 2412, 2414 and rungs 2416 are shown as discrete magnetic elements, two or more of these magnetic elements may be combined without departing from the scope hereof. Furthermore, in some embodiments, magnetic core 2402 is a single element magnetic core, such as a core formed by molding magnetic material in a ladder shape.

Rungs 2416 are divided into at least two separate groups 2418, where each group 2418 includes two or more of the N rungs 2416. Adjacent rungs 2416 within a common group 2418 are separated by a lengthwise separation distance 2420. For instance, rungs 2416(1) and 2416(2) of group 2418(1) are separated by a separation distance 2420(1), and rungs 2416(3) and 2416(4) of group 2418(2) are separated by a separation distance 2420(2). Adjacent rungs 2416 of different groups 2418, in contrast, are separated by a lengthwise separation distance 2422. For instance, rungs 2416(2) and 2416(3) are separated by a separation distance 2422(1), and rungs 2416(4) and 2416(5) are separated by a separation distance 2422(2). Each separation distance 2420 is smaller than each separation distance 2422, so that adjacent rungs within groups 2418 are substantially closer together than adjacent rungs of different groups 2418. For example, rung 2416(2) is substantially closer, in the lengthwise 2406 direction, to rung 2416(1) than to rung 2416(3). As another example, rung 2416(3) is substantially closer, in the lengthwise direction, to rung 2416(4) than to rung 2416(2).

Opposing ends of each winding 2404 form respective first and second solder tabs 2424, 2426, which are structurally capable of surface mount soldering to a common substrate, such as a PCB. See, for example, FIG. 26. Solder tabs 2424, 2426 of each winding 2404 serve as terminals for the winding, although in some alternate embodiments, one or more of solder tabs 2424, 2426 are replaced with a different connector type, such as a through-hole pin or a socket pin. Solder tabs 2424, 2426 are disposed on a bottom outer surface 2428 of first rail 2412.

Figure 30:
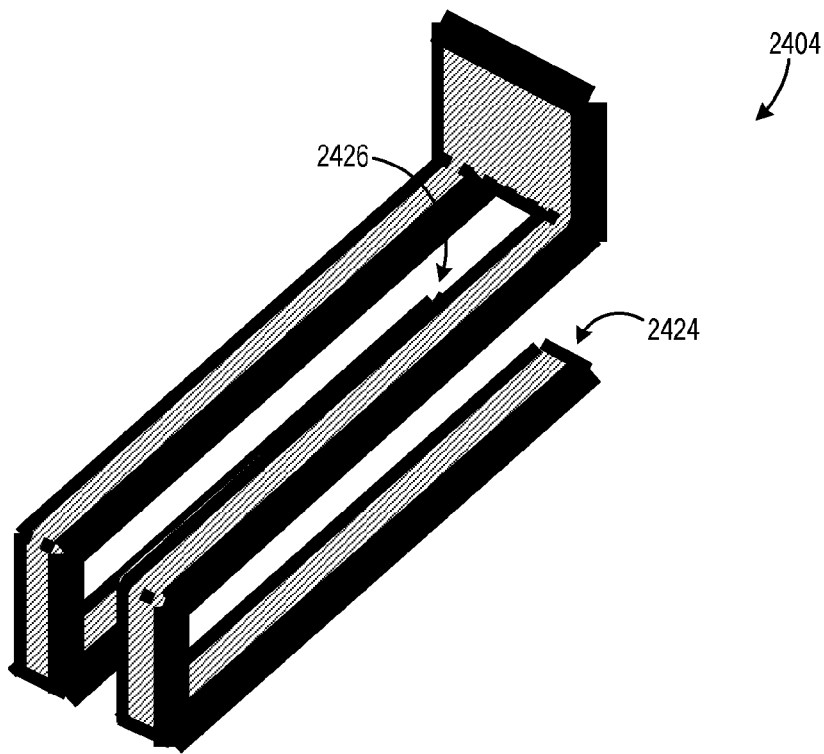
FIG. 30 shows a perspective view of a winding of the FIG. 24 coupled inductor at zero degree orientation.
Figure 31:
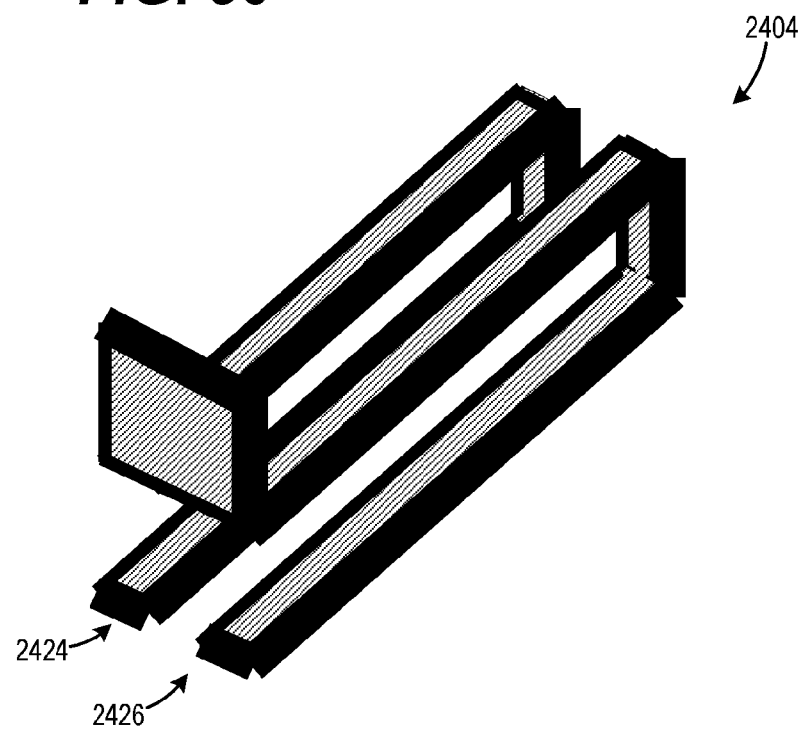
FIG. 31 shows a perspective view of a winding of the FIG. 24 coupled inductor at 180 degree orientation.

Each winding 2404 typically has a common geometric shape, as shown, to promote ease of winding procurement and manufacturing simplicity. However, windings 2404 are wound around respective rungs 2416 with alternating opposing orientations, such that windings 2404(1), 2404(3), 2404(5), and 2404(7) have a zero degree orientation, while windings 2404(2), 2404(4), 2404(6), and 2404(8) have a 180 degree orientation. Zero degree orientation is characterized by winding 2404 wrapping around first side outer surface 2462 to reach bottom outer surface 2428. 180 degree orientation is characterized by winding 2404 wrapping around second side outer surface 2464 to reach bottom outer surface 2428. Thus, windings 2404 having a 180 degree orientation are the mirror image of windings 2404 having a zero degree orientation, as seen when looking in the heightwise direction. FIG. 30 shows a perspective view of a winding 2404 instance at zero degree orientation, and FIG. 31 shows a perspective view of a winding 2404 instance at 180 degree orientation, as seen when looking at coupled inductor 2400 toward first side outer surface 2462.

Each winding 2404 is wound around a respective rung 2416 such that current flowing into each winding's first solder tab 2424 flows around the winding's respective rung 2416 in a common direction, as seen when looking cross-sectionally in the heightwise 2410 direction. For example, current flowing into each winding's first solder tab 2424 flows around the winding's respective rung 2416 in a counterclockwise direction 2432, as seen when looking cross-sectionally from second rail 2414 towards first rail 2412, as shown in FIG. 27. This winding configuration causes coupled inductor 2400 to have inverse magnetic coupling, when each first solder tab 2424 is electrically coupled to a respective switching node.

Spaces 2434 within ladder magnetic core 2402, but outside of groups 2418, provide leakage magnetic flux paths, thereby contributing to leakage inductance of windings 2404 (see FIG. 29). The fact that spaces 2434 are within magnetic core 2402 helps contain leakage magnetic flux within coupled inductor 2400, thereby helping minimize the likelihood of electromagnetic interference from leakage magnetic flux. Although not required, magnetic core 2402 typically further includes N leakage elements or "teeth" 2438, where each tooth 2438 is disposed on first rail 2412 and at least partially bridges a heightwise 2410 separation distance between first and second rails 2412, 2414. Leakage teeth 2438 and rung groups 2418 are disposed in an alternating manner along length 2406, as shown, for example, in FIGS. 28 and 29. Such leakage tooth 2438 distribution helps achieve short paths for leakage fluxes from multiple windings, which minimizes core losses.

Leakage teeth 2438 decrease the leakage magnetic flux path reluctance in spaces 2434, thereby promoting high and controllable leakage inductance values. Each leakage tooth 2438 is typically separated from second rail 2412 by a gap 2440. Gaps 2440 help prevent magnetic saturation at high current levels, and gap 2440 dimensions can be adjusted during coupled inductor design to tune leakage inductance values. For example, leakage inductance can be increased by decreasing a thickness of gaps 2440 in the heightwise 2410 direction. Additionally, winding 2404 leakage inductance values can be adjusted during inductor 2400 design by varying the configuration, such as the size and/or composition, of leakage teeth 2438.

In some alternate embodiments, such as where leakage teeth 2438 are formed of a magnetic material with a distributed air gap, leakage teeth 2438 completely bridge the heightwise separation distance between first and second rails 2412, 2414. Additionally, leakage teeth 2438 could alternately extend from second rail 2412 toward first rail 2414, such that gaps 2440 separate leakage teeth 2438 from first rail 2412. Furthermore, each leakage tooth 2438 could be split into first and second sub-teeth (not shown) extending into space 2434 from rails 2412 and 2414, respectively, such that the sub-teeth are separated by a gap in the widthwise 2408 direction.

The non-uniform rung 2416 distribution along length 2406 and the alternating winding 2404 orientation causes solder tabs 2424, 2426 to be non-uniformly distributed along length 2406. First solder tabs 2424 are divided into different groups 2442 of two or more solder tabs 2424, as shown in FIG. 26. Lengthwise separation distances 2444 between adjacent first solder tabs 2424 within each group 2442 are smaller than lengthwise separation distances 2446 between adjacent solder tabs 2424 of different groups. For example, solder tab 2424(2) is substantially closer in the lengthwise 2406 direction to solder tabs 2424(1) than to solder tab 2424(3), and solder tab 2424(3) is substantially closer in the lengthwise 2406 direction to solder tab 2424(4) than to solder tab 2424 (2). Such non-uniform solder tab distribution may facilitate aligning the solder tabs with an integrated circuit's terminals, such as discussed below with respect to FIG. 32.

The configuration of magnetic core 2402 enables the majority of inductor volume to be occupied by magnetic elements, namely rails 2412, 2414, rungs 2416, and leakage teeth 2438, thereby promoting large magnetic core cross-sectional area per unit volume. Large magnetic core cross-sectional area promotes low core losses in magnetic core 2402.

Although windings 2404 are shown as being single-turn foil windings, windings 2404 could be modified, as long as first solder tabs 2424, or analogous terminals such as through-hole pins, are non-uniformly distributed along length 2406. For example, in some alternate embodiments, windings 2404 are multi-turn windings, which promote large inductance values with small core losses.

Multiple instances of coupled inductor 2400 could be joined. For example, two instances of coupled inductor 2400 could be joined in the lengthwise 2406 direction to form a coupled inductor including sixteen windings 2404.

Figure 32:
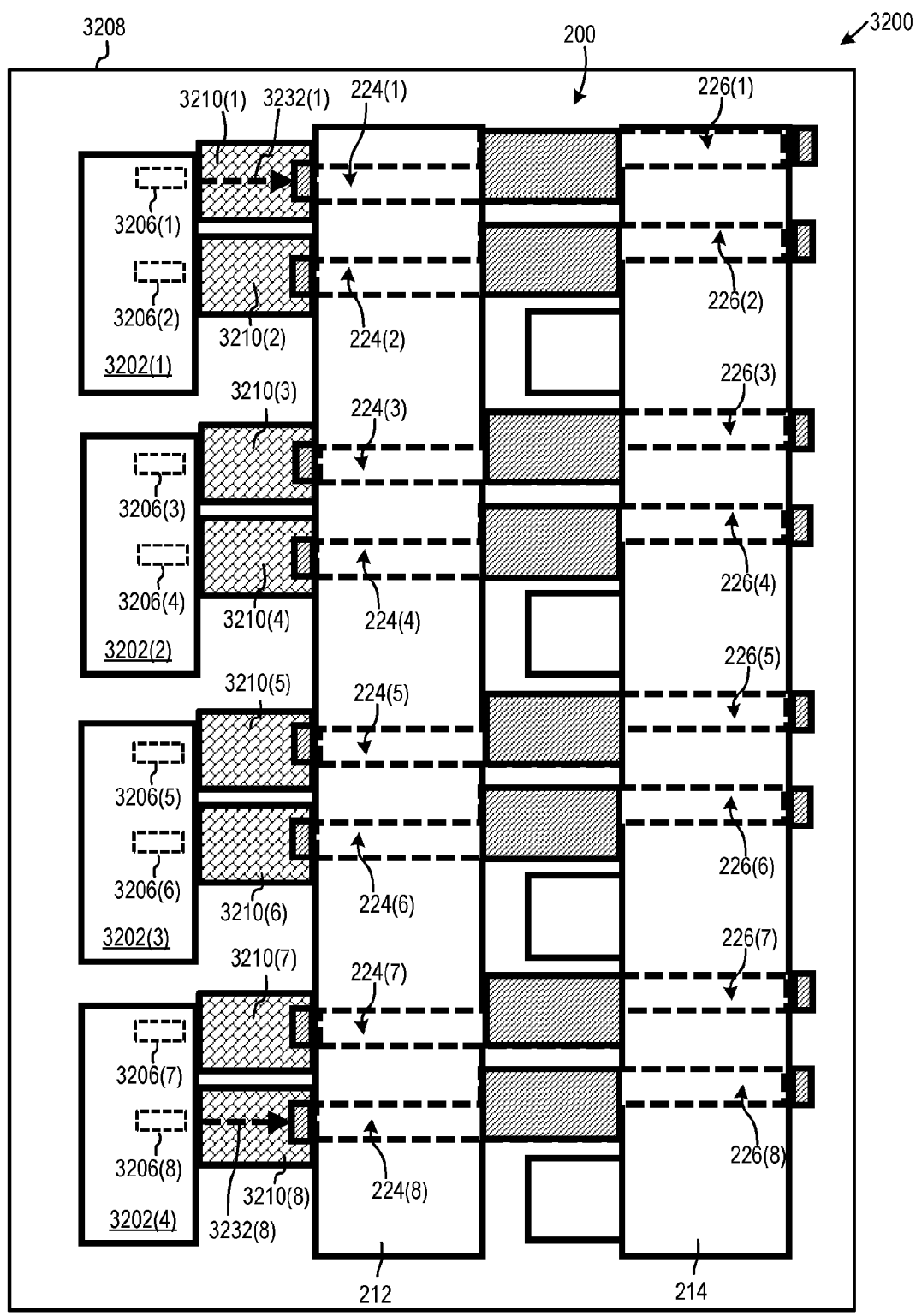
FIG. 32 shows a top plan view of part of an eight-phase buck switching power converter including the coupled inductor of FIG. 2 electrically coupled to four integrated circuits, according to an embodiment.
Figure 33:
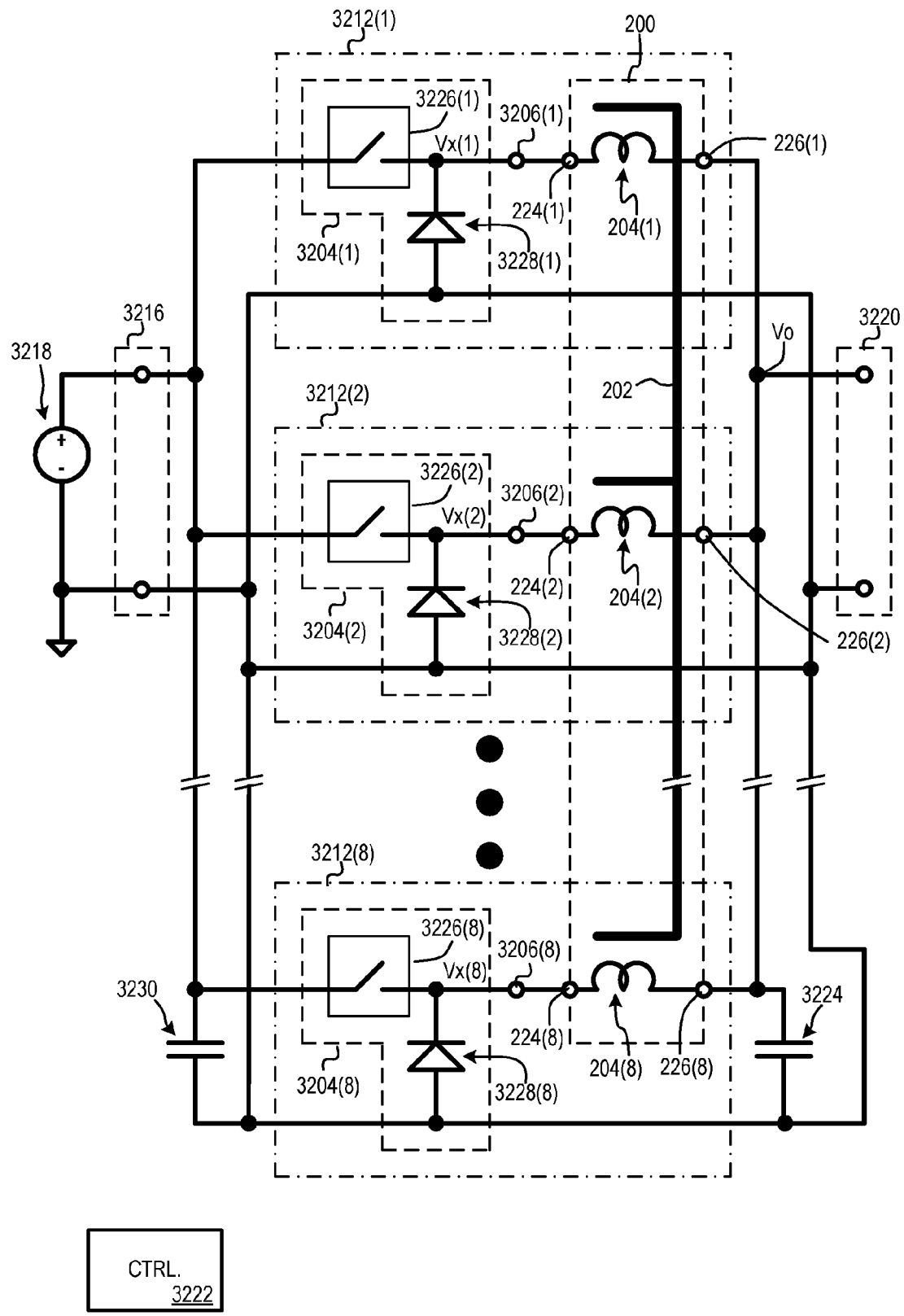
FIG. 33 is an electrical schematic of the FIG. 32 switching power converter.

One possible application of coupled inductors 200, 900, and 2400 is in switching power converters, including but not limited to multi-phase buck converters, multi-phase boost converters, or multi-phase buck-boost converters. For example, FIG. 32 shows a top plan view of part of an eight-phase buck switching power converter 3200 including an instance of coupled inductor 200. The outlines of windings 204 are denoted by dashed lines in FIG. 32 where obscured by magnetic core 202. FIG. 33 is an electrical schematic of converter 3200. Converter 3200 includes four integrated circuits 3202, where each integrated circuit 3202 includes two buck power stages or switching circuits 3204 (not visible in FIG. 32) and two terminal sets 3206. Each terminal set 3206 include one or more electrical terminals, such as one or more solder balls, disposed on a bottom outer surface of integrated circuit 3202. Terminal sets 3206 are symbolically indicated by dashed line in the FIG. 32 top plan view because the terminal sets are not visible when looking at the tops of integrated circuits 3202. Each terminal set 3206 provides electrical interface to a switching node Vx of a respective switching circuit 3204.

Coupled inductor 200 and integrated circuits 3202 are disposed on a PCB 3208, and solder tabs 224, 226 are soldered to the PCB. Each terminal set 3206 is electrically coupled to a respective first solder tab 224 by a PCB trace 3210. Each switching circuit 3204 and its respective winding 204 form part of a respective phase 3212 of converter 3200. Accordingly, each integrated circuit 3202 supports a respective pair of phases 3212. For example, integrated circuit 3202(1) supports phases 3212(1), 3212(2). Coupled inductor 200, however, supports all eight phases 3212 of converter 3200, such that all eight phases are magnetically coupled. Only three of the eight phases 3212 are shown in the FIG. 33 schematic to promote illustrative clarity Each switching circuit 3204 is electrically coupled to an input port 3216, which is in turn electrically coupled to an electric power source 3218. An output port 3220 is electrically coupled to an output node Vo, and each second solder tab 226 is electrically coupled to output node Vo.

A controller 3222 causes each switching circuit 3204 to repeatedly switch its respective first solder tab 224 between electric power source 3218 and ground, thereby switching its first solder tab between two different voltage levels, to transfer power from electric power source 3218 to a load (not shown) electrically coupled across output port 3220. Controller 3222 typically causes switching circuits 3204 to switch at a relatively high frequency, such as at 100 kilohertz or greater, to promote low ripple current magnitude and fast transient response, as well as to ensure that switching induced noise is at a frequency above that perceivable by humans. Additionally, in certain embodiments, controller 3222 causes switching circuits 3204 to switch out-of-phase with respect to each other to improve transient response and promote ripple current cancelation in output capacitors 3224. In some embodiments, controller 3222 is integrated in one or more integrated circuits 3202. In other embodiments, controller 3222 is implemented by circuitry (not shown) external to integrated circuits 3202.

Each switching circuit 3204 includes a control switching device 3226 that alternately switches between its conductive and non-conductive states under the command of controller 3222. Each switching circuit 3204 further includes a freewheeling device 3228 adapted to provide a path for current through its respective winding 204 when the control switching device 3226 of the switching circuit transitions from its conductive to non-conductive state. Freewheeling devices 3228 may be diodes, as shown, to promote system simplicity. However, in certain alternate embodiments, freewheeling devices 3228 may be supplemented by or replaced with a switching device operating under the command of controller 3222 to improve converter performance. For example, diodes in freewheeling devices 3228 may be supplemented by switching devices to reduce freewheeling device 3228 forward voltage drop. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier.

Controller 3222 is optionally configured to control switching circuits 3204 to regulate one or more parameters of converter 3200, such as input voltage, input current, input power, output voltage, output current, or output power. Converter 3200 typically includes one or more input capacitors 3230 electrically coupled across input port 3216 for providing a ripple component of switching circuit 3204 input current. Additionally, one or more output capacitors 3224 are generally electrically coupled across output port 3220 to shunt ripple current generated by switching circuits 3204. Input capacitors 3230, output capacitors 3224, electric power source 3218, input port 3216, and output port 3220 are not shown in FIG. 32.

Converter 3200 could be modified to have a different number of phases 3212. For example, converter 3200 could be modified to have only four phases 3212 and use a four-winding embodiment of coupled inductor 200. Converter 3200 could also be modified to use one of the other coupled inductors disclosed herein, such as inductor 900 or 2400, in place of inductor 200. Furthermore, converter 3200 could be modified to incorporate switching circuits formed of discrete components, instead of switching circuits 3204 integrated in integrated circuits 3202, at the cost of an increased parts count and a possible performance reduction. Moreover, converter 3200 could also be modified to have a different topology, such as a multi-phase boost or a multi-phase buck-boost converter topology, or an isolated topology, such as a flyback or forward converter topology.

Use of coupled inductor 200, 900, or 2400, instead of a conventional coupled inductor, may offer one or more advantages in a multi-phase switching power converter application. For example, the non-uniform winding terminal distribution of inductors 200, 900, and 2400 may enable the winding terminals to be substantially aligned with terminals of associated integrated circuits, thereby helping minimize length of conductors connecting the terminals and winding terminals. For example, consider again switching converter 3200 of FIG. 32. The non-uniform distribution of first solder tabs 224 enables the first solder tabs to be substantially aligned with integrated circuit terminal sets 3206, thereby enabling separation distances 3232 to be relatively short. Short separation distance 3232 helps minimize trace 3210 length and associated impedance, thereby helping minimize trace conduction losses and likelihood of electromagnetic interference from traces 3210. Accordingly, use of coupled inductor 200, 900, or 2400, instead of a conventional coupled inductor, in an integrated power stage application may improve converter efficiency, reduce converter heating, and promote electromagnetic compatibility with nearby circuitry.

As another example, use of coupled inductor 200, 900, or 2400, instead of a conventional coupled inductor, may enable an increase in the number of magnetically coupled phases without a significant increase in converter volume. Specifically, the non-uniform winding terminal distributions of inductors 200, 900, and 2400 allow windings to be placed close together, while achieving a "pin out" that allows for short connections to associated switching circuits. For instance, as discussed above with respect to FIG. 32, the coupled inductor 200 solder tab distribution allows for short connections to integrated circuit terminal sets 3206. Accordingly, the non-uniform winding terminal distributions of coupled inductors 200, 900, and 2400 helps enable close spacing of windings, thereby often allowing coupled inductors 200, 900, and 2400 to include more windings than conventional coupled inductors of similar size. Indeed, although coupled inductor 200 in converter 3200 has roughly the same outer dimensions as conventional coupled inductor 104 of prior art converter 100 (FIG. 1), coupled inductor 200 has twice the number of windings as coupled inductor 104. Thus, converter 3200 has twice the number of phases as prior art converter 100, even though both converters occupy approximately the same volume of space.

Figure 34:
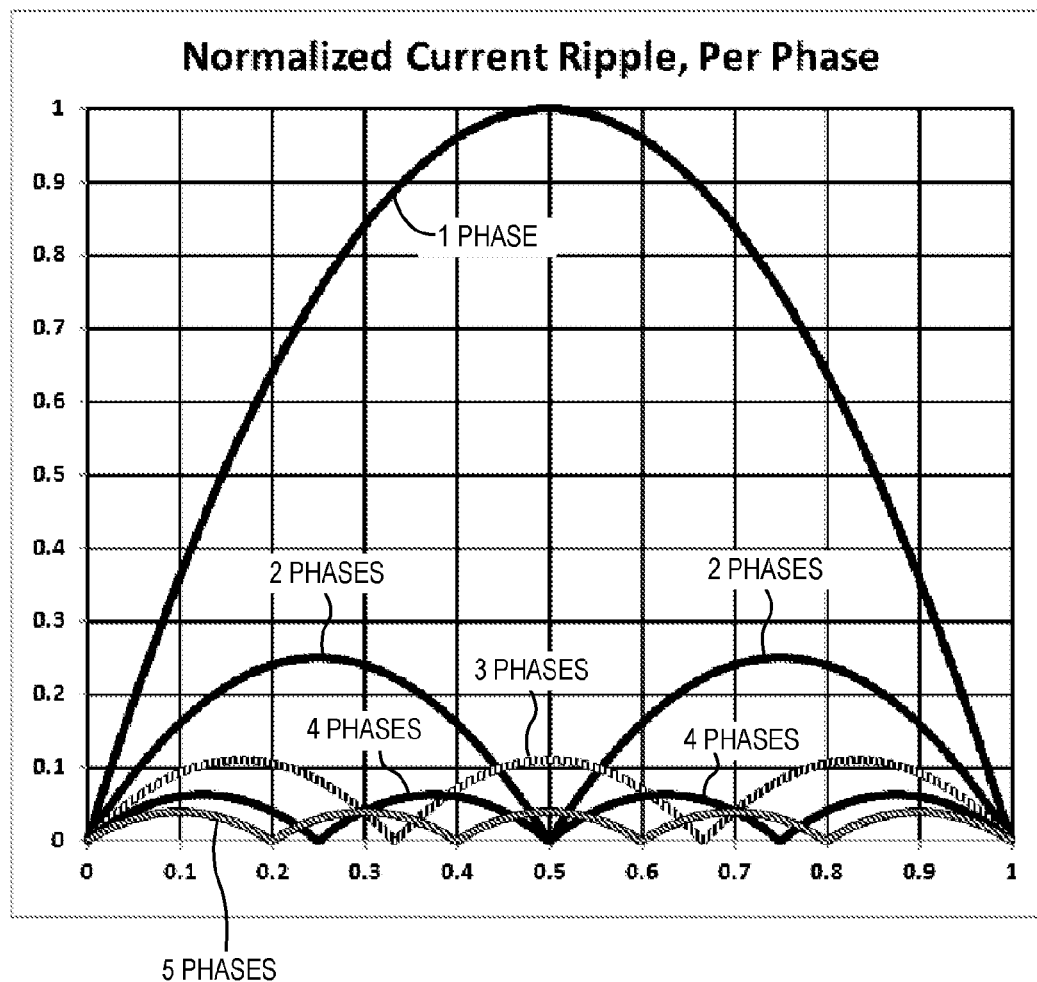
FIG. 34 shows an idealized graph of normalized ripple current per phase versus duty cycle, for different numbers of magnetically coupled phases, in a buck switching power converter of an arbitrary number of phases.

The magnetic coupling of a large number switching power converter phases, which is potentially enabled by use of coupled inductor 200, 900, or 2400 instead of a conventional coupled inductor, may offer significant benefits. Applicant has discovered that increasing the number of magnetically coupled phases in a switching power converter can significantly lower per-phase switching current magnitude, even if per-phase energy storage inductance remains unchanged. For example, FIG. 34 shows an idealized graph of normalized ripple current per phase versus duty cycle, for different numbers of magnetically coupled phases, in a buck switching power converter. As can be appreciated from FIG. 34, increasing the number of magnetically coupled phases, significantly decreases ripple current magnitude even if inductance value in each phase remains the same. Decreasing ripple current magnitude reduces conduction losses and also reduces output voltage ripple. In comparison, merely increasing the number of phases, without magnetic coupling the phases, typically requires a proportional increase in the inductance value per phase, because current per phase will decrease in proportion to the number of phases, and ripple current per phase must therefore proportionally decrease to maintain efficiency.

Furthermore, increasing the number of magnetically coupled phases reduces effective total inductance, assuming leakage inductance per phase remains unchanged as the number of magnetically coupled phases increases. A decrease in effective total inductance, in turn, allows for a faster rate of change of switching power converter current. Thus, increasing the number of magnetically coupled phases in a switching power converter may improve converter transient response.

Moreover, an increase in number of switching power converter phases normally decreases magnitude of current per phase. Such decrease in current magnitude may enable use of higher resistance inductor windings, thereby potentially allowing use of multi-turn windings. Use of multi-turn windings, in turn, helps reduce magnetic core losses by reducing required magnetic core flux density at a given inductance level.

Combinations of Features

Features described above as well as those claimed below may be combined in various ways without departing from the scope hereof. The following examples illustrate some possible combinations:

(A1) A coupled inductor may include a ladder magnetic core having a length, a width, and a height. The ladder magnetic core may include two rails extending in the lengthwise direction and joined in the widthwise direction by at least first, second, third, and fourth rungs sequentially disposed along the length of the magnetic core. The coupled inductor may further include first, second, third, and fourth windings wound at least partially around the first, second, third, and fourth rungs, respectively. The second rung may be substantially closer in the lengthwise direction to the first rung than to the third rung. The third rung may be substantially closer in the lengthwise direction to the fourth rung than to the second rung.

(A2) In the coupled inductor denoted as (A1), the ladder magnetic core may further include a first leakage tooth at least partially bridging a widthwise separation distance between the two rails, where the first leakage tooth is disposed along the length of the ladder magnetic core between the second and third rungs.

(A3) In the coupled inductor denoted as (A2), the first leakage tooth may bridge less than all of the widthwise separation distance between the two rails.

(A4) In either of the coupled inductors denoted as (A2) or (A3), the ladder magnetic core may further include a second leakage tooth at least partially bridging the widthwise separation distance between the two rails, and the third and fourth rungs may be disposed along the length of the ladder magnetic core between the first and second leakage teeth.

(A5) In any of the coupled inductors denoted as (A1) through (A4), respective ends of the first, second, third, and fourth windings may form first, second, third, and fourth solder tabs, respectively, where the first, second, third, and fourth solder tabs are structurally capable of surface mount soldering to a common substrate. The second solder tab may be substantially closer in the lengthwise direction to the first solder tab than to the third solder tab. The third solder tab may be substantially closer in the lengthwise direction to the fourth solder tab than to the second solder tab.

(A6) In the coupled inductor denoted as (A5), the two rails may include first and second rails, and each of the first, second, third, and fourth solder tabs may be at least partially disposed on a bottom outer surface of the first rail.

(A7) In either of the coupled inductors denoted as (A5) or (A6), the windings may be arranged such that current flowing into the first, second, third, and fourth solder tabs flows in a common direction around each of the first, second, third, and fourth rungs, respectively, when seen looking cross-sectionally in the widthwise direction of the magnetic core.

(A8) In any of the coupled inductors denoted as (A1) through (A7), the first, second, third, and fourth windings may have respective leakage inductance values that are substantially identical.

(B1) A coupled inductor may include a ladder magnetic core having a length, a width, and a height. The ladder magnetic core may include first and second rails extending in the lengthwise direction and joined in the widthwise direction by at least first and second rungs. The coupled inductor may further include first and second windings. The first winding may be wound, in a first orientation, at least partially around the first rung. The second winding may be wound, in a second orientation, at least partially around the second rung, where the second orientation is opposite to the first orientation. Opposing ends of the first winding may form first and second solder tabs, respectively, and opposing ends of the second winding may form third and fourth solder tabs, respectively. The first and third solder tabs may be disposed at least partially on a bottom outer surface of the first rail, and the second and fourth solder tabs may be disposed at least partially on a bottom outer surface of the second rail. The first and second windings may be arranged such that current flowing into the first and third solder tabs flows in a common direction around each of the first and second rungs, respectively, when seen looking cross-sectionally in the widthwise direction of the magnetic core.

(B2) In the coupled inductor denoted as (B1), each of the first and second windings may have a common geometric shape.

(B3) In either of the coupled inductors denoted as (B1) or (B2), the ladder magnetic core may further include a third rung joining the first and second rails in the widthwise direction, and the coupled inductor may further include a third winding wound, in the first orientation, at least partially around the third rung.

(B4) In the coupled inductor denoted as (B3): (i) opposing ends of the third winding may form fifth and sixth solder tabs, respectively, (ii) the fifth solder tab may be disposed at least partially on the bottom outer surface of the first rail, (iii) the sixth solder tab may be disposed at least partially on the bottom outer surface of the second rail, and (iv) the windings may be arranged such that current flowing into the first, third, and fifth solder tabs flows in a common direction around each of the first, second, and third rungs, respectively, when seen looking cross-sectionally in the widthwise direction of the magnetic core.

(B5) In the coupled inductor denoted as (B4): (i) the third solder tab may be disposed, in the lengthwise direction between the first and fifth solder tabs, (ii) the fourth solder tab may be disposed, in the lengthwise direction, between the second and sixth solder tabs, and (iii) each of the second, third, and sixth solder tabs may be larger than each of the first, fourth, and fifth solder tabs.

(B6) In any of the coupled inductors denoted as (B1) through (B5), the ladder magnetic core may further include a leakage tooth extending between the first and second rails in the widthwise direction, where the leakage tooth is disposed, in the heightwise direction, over at least one of the first, second, and third rungs.

(B7) In any of the coupled inductors denoted as (B1) through (B6), the first, second, and third windings may have respective leakage inductance values that are substantially identical.

(B8) In any of the coupled inductors denoted as (B1) through (B7), each of the first and second windings may be a single-turn winding, each of the first and second rungs may have a cross section in the lengthwise and heightwise directions, and a rung length by a rung height may be substantially equal to two.

(C1) A coupled inductor may include a ladder magnetic core having a length, a width, and a height. The ladder magnetic core may include two rails joined in the heightwise direction by at least first, second, and third rungs respectively disposed along the length of the magnetic core. The coupled inductor may further include first, second, and third windings. The first winding may be wound, in a first orientation, at least partially around the first rung, and the second winding may be wound, in a second orientation opposite to the first orientation, at least partially around the second rung. The third winding may be wound, in the first orientation, at least partially around the third rung. The second rung may be substantially closer in the lengthwise direction to the first rung than to the third rung.

(C2) In the coupled inductor denoted as (C1), each of the first, second, and third windings may have a common geometrical shape.

(C3) In either of the coupled inductors denoted as (C1) or (C2): (i) respective ends of the first, second, and third windings may form first, second, and third solder tabs, respectively, (ii) the first, second, and third solder tabs may be structurally capable of surface mount soldering to a common substrate, and (iii) the second solder tab may be substantially closer in the lengthwise direction to the first solder tab than to the third solder tab.

(C4) In the coupled inductor denoted as (C3), each of the first, second, and third solder tabs may be at least partially disposed on a bottom outer surface of a common one of the two rails.

(C5) In any of the coupled inductors denoted as (C1) through (C4): (i) the ladder magnetic core may further include a fourth rung joining the first and second rails in the heightwise direction, (ii) the third rung may be disposed, in the lengthwise direction, between the first leakage tooth and the fourth rung, (iii) the third rung may be substantially closer in the lengthwise direction to the fourth rung than to the second rung, and (iv) the coupled inductor further may include a fourth winding wound, in the second orientation, at least partially around the fourth rung.

(C6) In the coupled inductor denoted as (C5): (i) the ladder magnetic core may further include first and second leakage teeth at least partially bridging a heightwise separation distance between the two rails, (ii) the first leakage tooth may be disposed on at least one of the two rails between the second and third rungs, and (iii) the third and fourth rungs may be disposed along the length of the ladder magnetic core between the first and second leakage teeth.

(C7) In any of the coupled inductors denoted as (C1) through (C5), the ladder magnetic core may further include a first leakage tooth at least partially bridging a heightwise separation distance between the two rails, where the first leakage tooth is disposed on at least one of the two rails between the second and third rungs.

(C8) In any of the coupled inductors denoted as (C1) through (C7), the first, second, third, and fourth windings may have respective leakage inductance values that are substantially identical.

(D1) A multi-phase switching power converter may include a coupled inductor including a ladder magnetic core having a length, a width, and a height. The ladder magnetic core may include two rails extending in the lengthwise direction and joined in the widthwise direction by at least first, second, third, and fourth rungs sequentially disposed along the length of the magnetic core. The coupled inductor may further include first, second, third, and fourth windings wound at least partially around the first, second, third, and fourth rungs, respectively. The second rung may be substantially closer in the lengthwise direction to the first rung than to the third rung, and the third rung may be substantially closer in the lengthwise direction to the fourth rung than to the second rung. The multi-phase switching power converter may further include first, second, third, and fourth switching circuits, where each switching circuit is adapted to repeatedly switch an end of a respective one of the first, second, third, and fourth windings between at least two different voltage levels.

(D2) The multi-phase switching power converter denoted as (D1) may further include a controller adapted to control the first, second, third, and fourth switching circuits such that each of the switching circuits switches out of phase with respect to at least one other of the switching circuits.

(D3) In either of the multi-phase switching power converters denoted as (D1) or (D2), the ladder magnetic core may further include a first leakage tooth at least partially bridging a widthwise separation distance between the two rails, where the first leakage tooth is disposed along the length of the ladder magnetic core between the second and third rungs.

(D4) In any of the multi-phase switching power converters denoted as (D1) through (D3): (i) the multi-phase switching power converter may further include a printed circuit board, (ii) respective ends of the first, second, third, and fourth windings may form first, second, third, and fourth solder tabs, (iii) the first, second, third, and fourth solder tabs may be soldered to the printed circuit board, (iv) the second solder tab may be substantially closer in the lengthwise direction to the first solder tab than to the third solder tab, and (v) the third solder tab may be substantially closer in the lengthwise direction to the fourth solder tab than to the second solder tab.

(E1) A multi-phase switching power converter may include a coupled inductor including a ladder magnetic core having a length, a width, and a height. The ladder magnetic core may include first and second rails extending in the lengthwise direction and joined in the widthwise direction by at least first and second rungs. The coupled inductor may further include first and second windings. The first winding may be wound, in a first orientation, at least partially around the first rung, and the second winding may be wound, in a second orientation, at least partially around the second rung, where the second orientation is opposite to the first orientation. Opposing ends of the first winding may form first and second solder tabs, respectively, and opposing ends of the second winding may form third and fourth solder tabs, respectively. The first and third solder tabs may be disposed at least partially on a bottom outer surface of the first rail, and the second and fourth solder tabs may be disposed at least partially on a bottom outer surface of the second rail. The first and second windings may be arranged such that current flowing into the first and third solder tabs flows in a common direction around each of the first and second rungs, respectively, when seen looking cross-sectionally in the widthwise direction of the magnetic core. The multi-phase switching power converter may further include first and second switching circuits, where the first switching circuit is adapted to repeatedly switch the first solder tab between at least two different voltage levels, and the second switching circuit is adapted to repeatedly switch the third solder tab between at least two different voltage levels.

(E2) The multi-phase switching power converter denoted as (D1) may further include a controller adapted to control the first and second switching circuits such that the switching circuits switch out of phase with respect to each other.

(E3) Either of the multi-phase switching power converters denoted as (E1) or (E2) may further include a printed circuit board, and the first, second, third, and fourth solder tabs may be soldered to the printed circuit board.

(E4) In any of the multi-phase switching power converters denoted as (E1) through (E3), each of the first and second windings may have a common geometric shape.

(F1) A multi-phase switching power converter may include a coupled inductor including a ladder magnetic core having a length, a width, and a height. The ladder magnetic core may include two rails joined in the heightwise direction by at least first, second, and third rungs respectively disposed along the length of the magnetic core. The coupled inductor may further include first, second, and third windings. The first winding may be wound, in a first orientation, at least partially around the first rung, and the second winding may be wound, in a second orientation opposite to the first orientation, at least partially around the second rung. The third winding may be wound, in the first orientation, at least partially around the third rung. The second rung may be substantially closer in the lengthwise direction to the first rung than to the third rung. The multi-phase switching power converter may further include first, second, and third switching circuits, where each switching circuit is adapted to repeatedly switch an end of a respective one of the first, second, and third windings between at least two different voltage levels.

(F2) The multi-phase switching power converter denoted as (F1) may further include a controller adapted to control the first, second, and third switching circuits such that each of the switching circuits switches out of phase with respect to at least one other of the switching circuits.

(F3) In either of the multi-phase switching power converters denoted as (F1) or (F2), the ladder magnetic core may further include a first leakage tooth at least partially bridging a heightwise separation distance between the two rails, where the first leakage tooth is disposed on at least one of the two rails between the second and third rungs.

(F4) In any of the multi-phase switching power converters denoted as (F1) through (F3): (i) the multi-phase switching power converter may further include a printed circuit board, (ii) respective ends of the first, second, and third windings may form first, second, and third solder tabs, respectively, (iii) the first, second, and third solder tabs may be soldered to the printed circuit board, and (iv) the second solder tab may be substantially closer in the lengthwise direction to the first solder tab than to the third solder tab.

(F5) In the multi-phase switching power converter denoted as (F4), the two rails may include first and second rails, and each of the first, second, and third solder tabs may be at least partially disposed on a bottom outer surface of the first rail.

(F6) In any of the multi-phase switching power converters denoted as (F1) through (F5), each of the first, second, and third windings may have a common geometrical shape.

Changes may be made in the above methods and systems without departing from the scope hereof. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A coupled inductor, comprising:
   a ladder magnetic core having a length, a width, and a height, the ladder magnetic core including first and second rails extending in the lengthwise direction and joined in the widthwise direction by at least first and second rungs;
   a first winding wound at least partially around the first rung; and
   a second winding wound at least partially around the second rung, the second winding being rotated by 180 degrees with respect to the first winding when seen looking cross-sectionally in the height direction of the magnetic core;
   opposing ends of the first winding forming first and second solder tabs, respectively;
   opposing ends of the second winding forming third and fourth solder tabs, respectively;
   the first and third solder tabs being disposed at least partially on a bottom outer surface of the first rail;
   the second and fourth solder tabs being disposed at least partially on a bottom outer surface of the second rail;
   the first and second windings being arranged such that current flowing into the first and third solder tabs flows in a common direction around each of the first and second rungs, respectively, when seen looking cross-sectionally in the widthwise direction of the magnetic core.

2. The coupled inductor of claim 1, each of the first and second windings having a common geometric shape.

3. The coupled inductor of claim 2, the ladder magnetic core further comprising a third rung joining the first and second rails in the widthwise direction, and the coupled inductor further comprising a third winding wound at least partially around the third rung, the third winding being rotated by 180 degrees with respect to the second winding when seen looking cross-sectionally in the height direction of the magnetic core.

4. The coupled inductor of claim 3, wherein:
   opposing ends of the third winding form fifth and sixth solder tabs, respectively;
   the fifth solder tab is disposed at least partially on the bottom outer surface of the first rail;
   the sixth solder tab is disposed at least partially on the bottom outer surface of the second rail; and
   the windings are arranged such that current flowing into the first, third, and fifth solder tabs flows in a common direction around each of the first, second, and third rungs, respectively, when seen looking cross-sectionally in the widthwise direction of the magnetic core.

5. The coupled inductor of claim 4, the ladder magnetic core further comprising a leakage tooth extending between the first and second rails in the widthwise direction, the leakage tooth disposed, in the heightwise direction, over at least one of the first, second, and third rungs.

6. The coupled inductor of claim 5, the first, second, and third windings having respective leakage inductance values that are substantially identical.

7. The coupled inductor of claim 2, each of the first and second windings being a single-turn winding, each of the first and second rungs having a cross section in the lengthwise and heightwise directions, a ratio of rung length to rung height being substantially equal to two.

8. A coupled inductor, comprising:
   a ladder magnetic core having a length, a width, and a height, the ladder magnetic core including first and second rails extending in the lengthwise direction and joined in the widthwise direction by at least first, second, and third rungs;
   a first winding wound at least partially around the first rung;
   a second winding wound at least partially around the second rung, the second winding being rotated by 180 degrees with respect to the first winding when seen looking cross-sectionally in the height direction of the magnetic core; and
   a third winding wound at least partially around the third rung, the third winding being rotated by 180 degrees with respect to the second winding when seen looking cross-sectionally in the height direction of the magnetic core;
   opposing ends of the first winding forming first and second solder tabs, respectively;
   opposing ends of the second winding forming third and fourth solder tabs, respectively;
   opposing ends of the third winding form fifth and sixth solder tabs, respectively;
   the first, third, and fifth solder tabs being disposed at least partially on a bottom outer surface of the first rail;
   the second, fourth, and sixth solder tabs being disposed at least partially on a bottom outer surface of the second rail;
   the windings being arranged such that current flowing into the first, third, and fifth solder tabs flows in a common direction around each of the first, second, and third rungs, respectively, when seen looking cross-sectionally in the widthwise direction of the magnetic core;
   each of the first and second windings having a common geometric shape;
   the third solder tab being disposed, in the lengthwise direction between the first and fifth solder tabs;
   the fourth solder tab being disposed, in the lengthwise direction, between the second and sixth solder tabs; and
   each of the second, third, and sixth solder tabs being larger than each of the first, fourth, and fifth solder tabs.

9. A multi-phase switching power converter, comprising:
   a coupled inductor, including:
      a ladder magnetic core having a length, a width, and a height, the ladder magnetic core including first and second rails extending in the lengthwise direction and joined in the widthwise direction by at least first and second rungs,
      a first winding wound at least partially around the first rung, and
      a second winding wound at least partially around the second rung, the second winding being rotated by 180 degrees with respect to the first winding when seen looking cross-sectionally in the height direction of the magnetic core, opposing ends of the first winding forming first and second solder tabs, respectively, opposing ends of the second winding forming third and fourth solder tabs, respectively, the first and third solder tabs being disposed at least partially on a bottom outer surface of the first rail, the second and fourth solder tabs being disposed at least partially on a bottom outer surface of the second rail, the first and second windings being arranged such that current flowing into the first and third solder tabs flows in a common direction around each of the first and second rungs, respectively, when seen looking cross-sectionally in the widthwise direction of the magnetic core; and first and second switching circuits, the first switching circuit adapted to repeatedly switch the first solder tab between at least two different voltage levels, the second switching circuit adapted to repeatedly switch the third solder tab between at least two different voltage levels.

10. The multi-phase switching power converter of claim 9, further comprising a controller adapted to control the first and second switching circuits such that the switching circuits switch out of phase with respect to each other.

11. The multi-phase switching power converter of claim 10, further comprising a printed circuit board, the first, second, third, and fourth solder tabs being soldered to the printed circuit board.

12. The multi-phase switching power converter of claim 11, each of the first and second windings having a common geometric shape.

* * * * *